United States Patent [19]
Norsworthy

[11] Patent Number: 5,459,319
[45] Date of Patent: Oct. 17, 1995

[54] RADIATION DETECTOR CIRCUIT HAVING A 1-BIT QUANTIZED OUTPUT

[75] Inventor: Keith H. Norsworthy, Bellevue, Wash.

[73] Assignee: The Boeing Company, Seattle, Wash.

[21] Appl. No.: 159,538

[22] Filed: Feb. 23, 1988

[51] Int. Cl.⁶ .................... G01J 1/00; G01J 5/00; H01J 40/14
[52] U.S. Cl. .......... 250/349; 250/332; 250/334; 250/338.1; 250/578.1; 348/164; 348/242
[58] Field of Search ............ 358/213.15, 213.18, 358/113; 250/578, 332, 334, 338.1, 349, 578.1; 348/164, 241

[56] References Cited

U.S. PATENT DOCUMENTS

| | | | |
|---|---|---|---|
| 3,614,450 | 10/1971 | Hill et al. | 250/210 |
| 3,904,818 | 9/1975 | Kovac | 250/578 |
| 4,072,863 | 2/1978 | Roundy | 250/332 |
| 4,173,772 | 11/1979 | White | 358/213.16 |
| 4,409,483 | 10/1983 | Turley | 250/332 |
| 4,659,928 | 4/1987 | Tew | 250/332 |

OTHER PUBLICATIONS

*Linear and Interface Circuits, Applications;* D. E. Pippenger et al.; Texas Instruments, Inc., 1985; pp. 2–15 to 2–17.
*Communication Systems;* A. B. Carlson; McGraw-Hill Book Company, 1982; pp. 326–329.

"The Technological Requirements for Application Specific Integrated Circuits"; R. W. Broderson; IEEE, 1985; pp. 13–16.
"MOS.ADC-Filter Combination That Does Not Require Precision Analog Components"; M. S. Hauser, et al.; ISSC Conference; Feb. 13, 1985.

*Primary Examiner*—Stephen C. Buczinski
*Attorney, Agent, or Firm*—Mary Y. Redman

[57] ABSTRACT

Radiation detectors are mounted in an optic focal plane of an infrared radiation sensor system. The radiation detectors produce output signals indicating detected radiation. The output signals are sampled by a sample-and-hold circuit and passed to a 1-bit comparator. The comparator produces a 1-bit signal at a high voltage level for samples of the output signal that are greater than a reference voltage and at a low voltage level for samples of the output signal that are less than the reference voltage. In this manner, the comparator reduces the effects of any gamma spikes on the measurement of intensity of radiation. The 1-bit signal is less susceptible to effects of interference than analog signals in conventional systems and the 1-bit comparator produces this 1-bit signal without consuming a great deal of electrical power. A multiplexor carries such 1-bit signals from the focal plane to a processor over less wires than in conventional systems. The processor receives and integrates the 1-bit signals and produces an output that indicates intensity and angle of detected radiation.

28 Claims, 14 Drawing Sheets

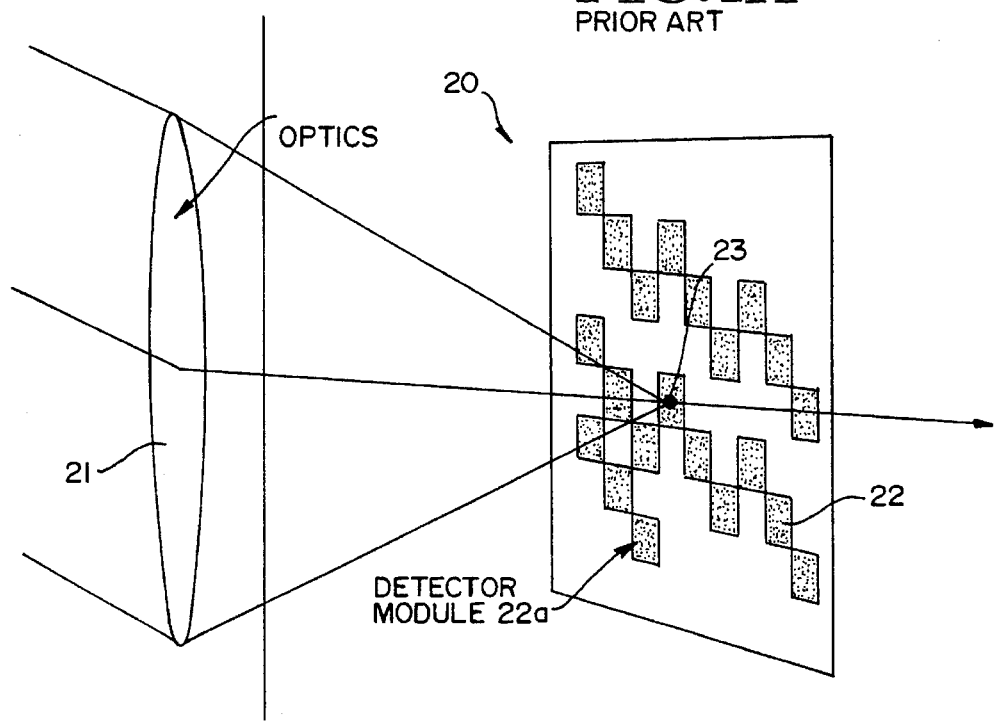
FIG. 1A
PRIOR ART
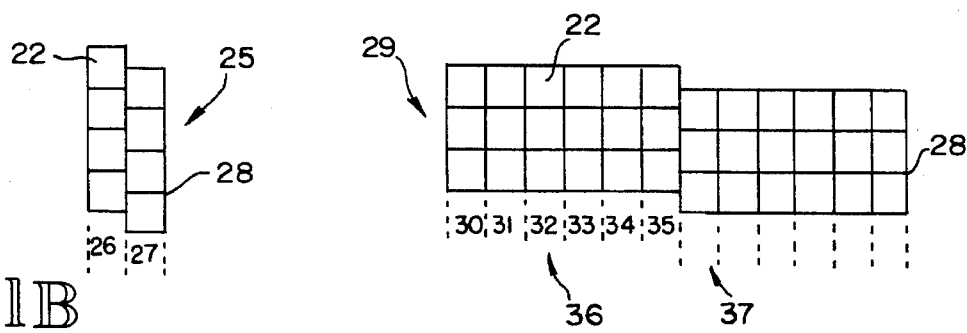
FIG. 1B
PRIOR ART
FIG. 1C
PRIOR ART
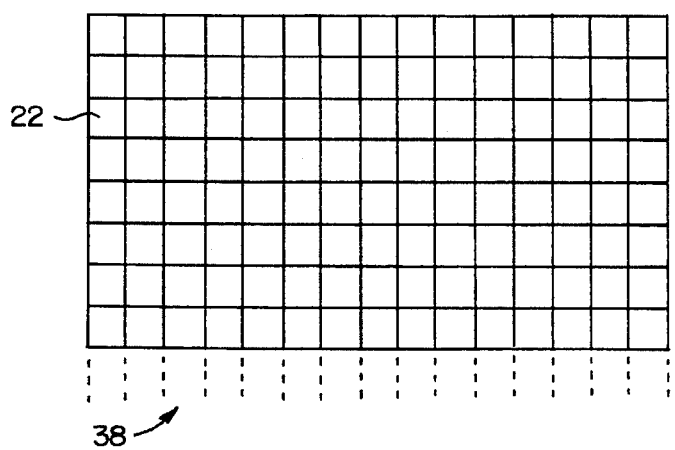
FIG. 1D
PRIOR ART

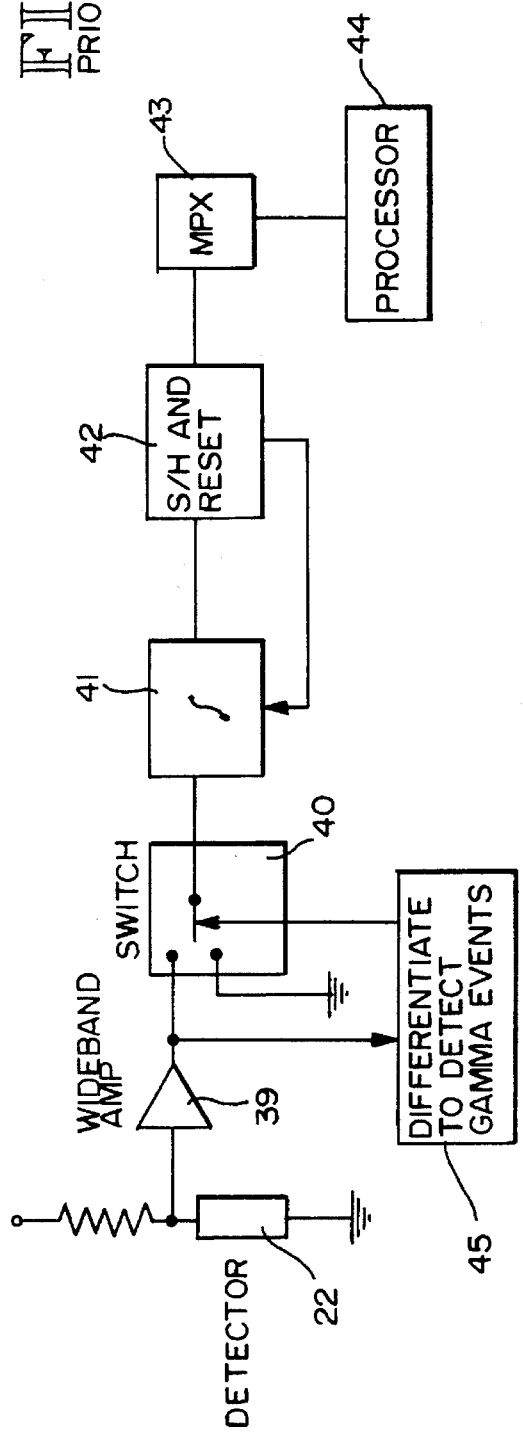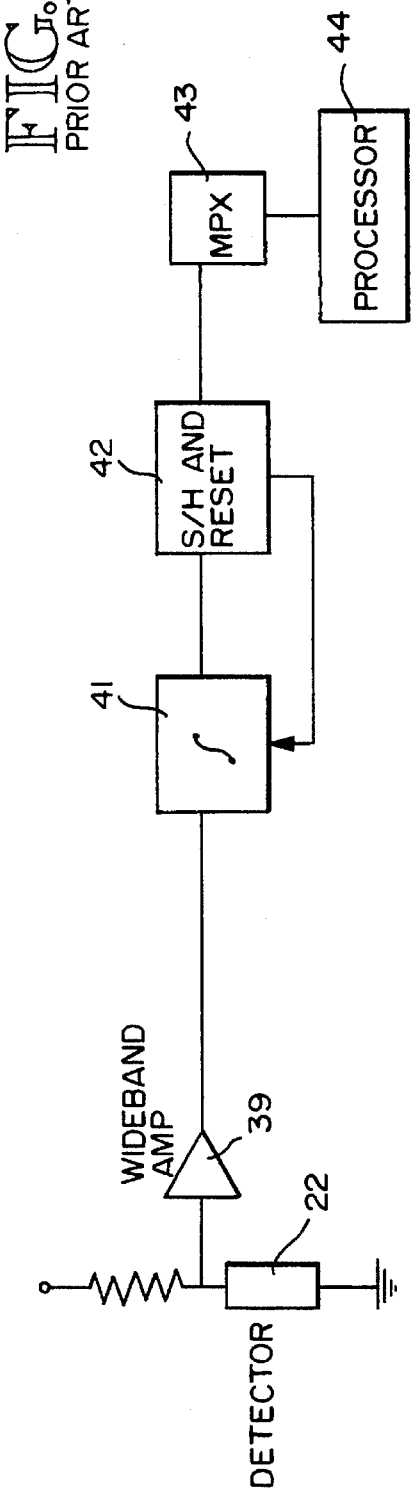

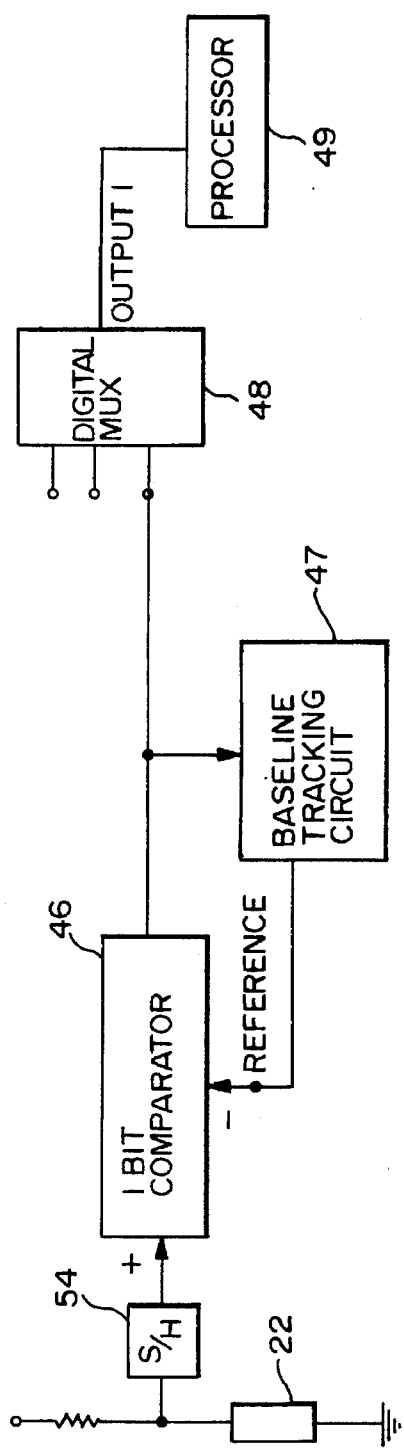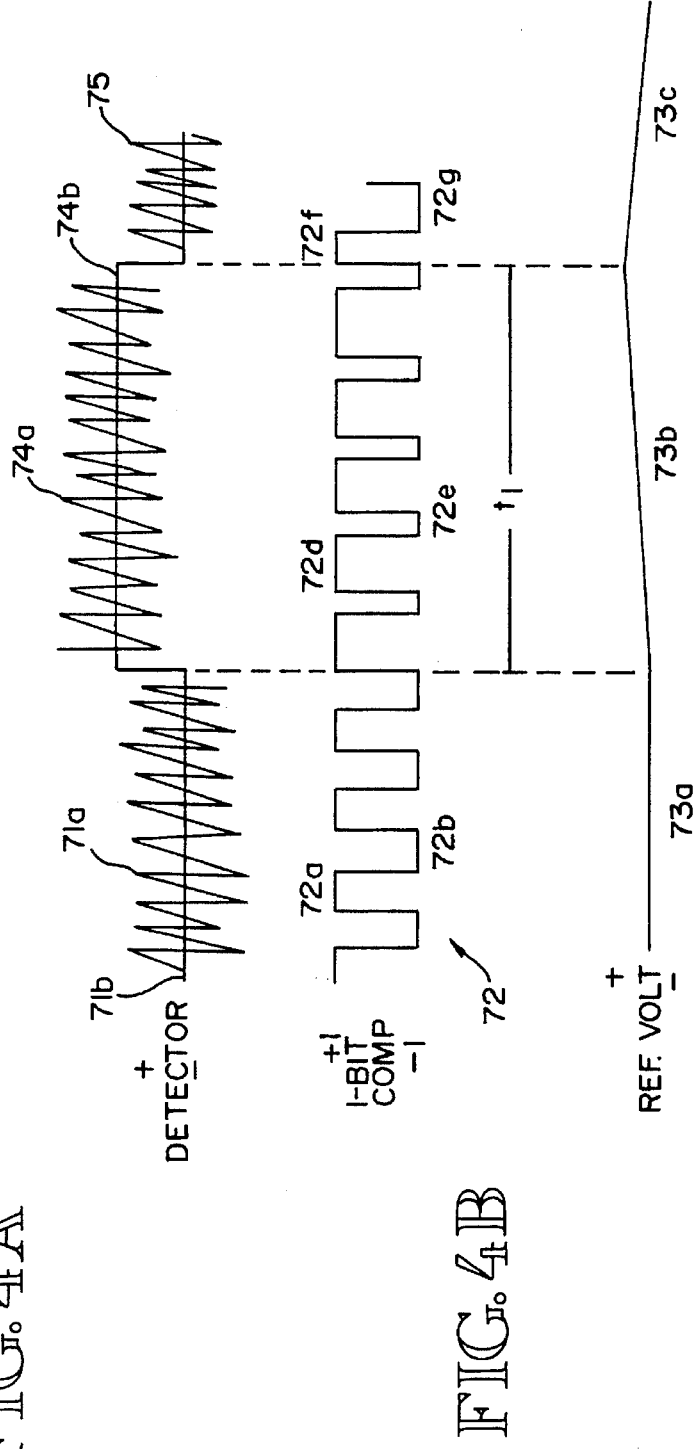

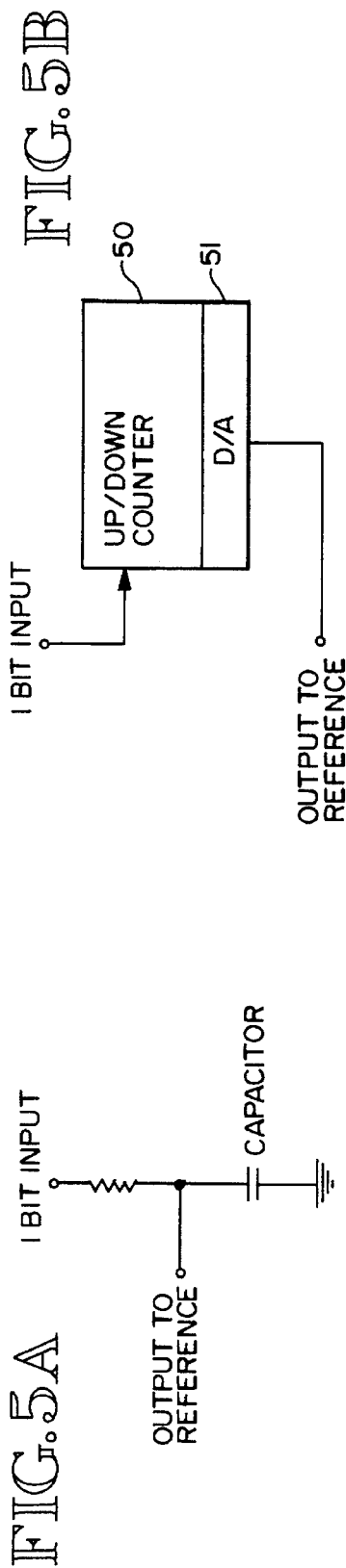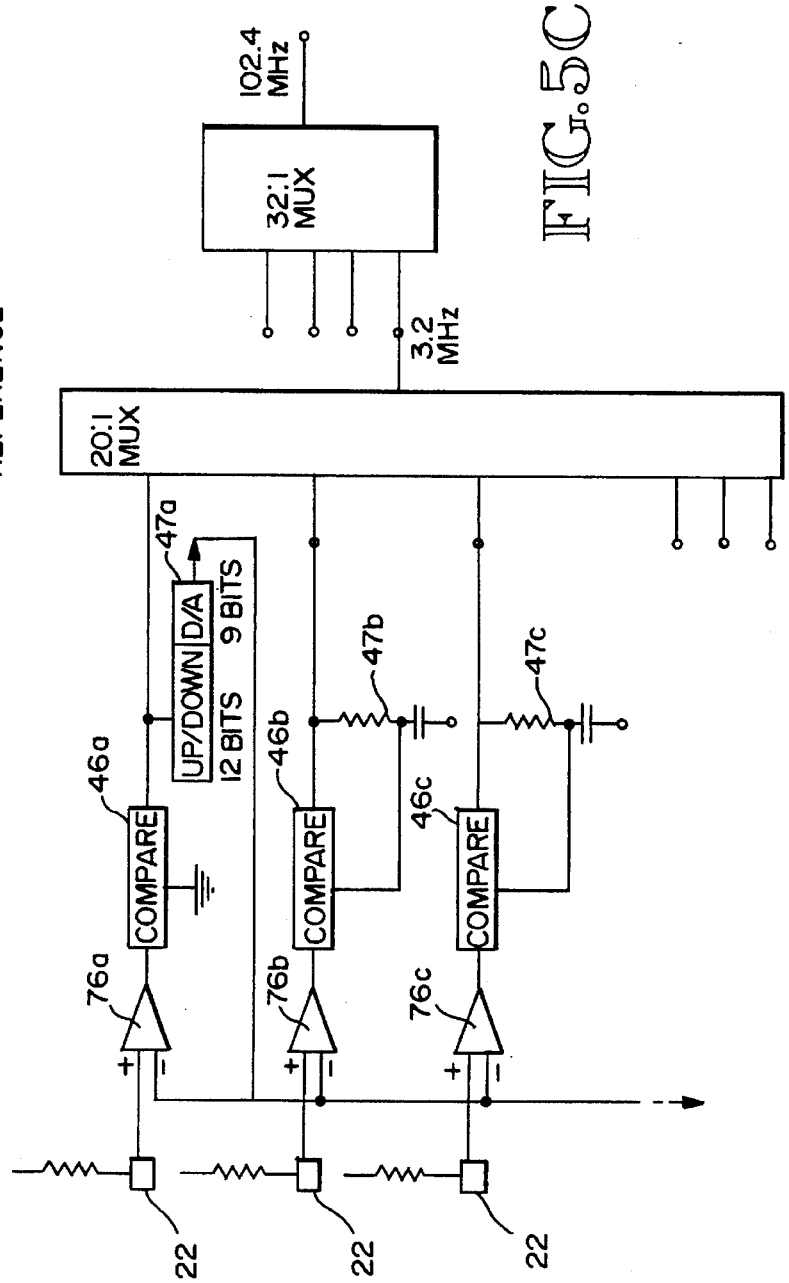

CONVENTIONAL FOCAL PLANE
4 DETECTOR SATDI
(4 SAMPLES PER DWELL)

STOCHASTIC FOCAL PLANE
DIFFERENTIAL DETECTOR
PAIRS PROCESSING

CONVENTIONAL FOCAL PLANE
1 DETECTOR, NO SATDI
(4 SAMPLES PER DWELL)

STOCHASTIC FOCAL PLANE
SINGLE DETECTOR PROCESSING
(64 SAMPLES PER DWELL)

RADIATION DETECTOR CIRCUIT HAVING A 1-BIT QUANTIZED OUTPUT

FIELD OF THE INVENTION

The invention concerns radiation detector circuits, and more specifically concerns radiation detector circuits having a 1-bit comparator which converts an output signal of a radiation detector into a 1-bit signal.

BACKGROUND OF THE INVENTION

Space vehicles and aircraft have infrared sensor systems that scan the Earth or space and detect infrared radiation generated from Earth or in space to track missiles, measure remote temperatures, and view night scenes. Infrared radiation detected by these sensor systems includes target radiation and background radiation. Missiles, growing crops, and humans comprise targets which generate generally changing intensities of infrared radiation relative to generally constant background radiation that stars in space and the earth generate, for instance.

Infrared sensor systems include arrays of radiation detectors that sense infrared radiation and generate output signals depending on the intensity of detected infrared radiation. The radiation detectors are also responsive to high energy gamma rays that frequently occur in space. The radiation detectors generate very short duration, high amplitude signals, known as gamma spikes, in response to the high energy of the gamma rays. However, it is undesirable for infrared radiation detectors to respond to gamma rays in this manner, because gamma spikes complicate the accurate measurement of intensity of detected infrared radiation.

Infrared sensor systems typically have an optical portion that focuses radiation onto infrared detectors mounted in a focal plane of that optical portion. These infrared detectors each generate an analog signal that indicates the intensity of radiation detected by such a detector. Multiplexors convey these analog signals from the radiation detectors to a processor which analyzes the intensity of detected radiation. Such analog signals tend to interfere with one another. Systems involving analog signals are greatly effected by external interference.

Some infrared sensor systems use analog-to-digital converters to convert the analog signals from radiation detectors into digital signals. These digital signals are much less likely to interfere with one another. Systems involving digital signals are effected by external interference much less than systems involving analog signals. Despite the advantages of systems involving digital signals over systems involving analog signals, analog-to-digital converters consume a great deal of electrical power, the supply of which is limited aboard space vehicles and aircraft.

Current infrared sensor systems have approximately 40 thousand infrared detectors and multiplexors sample each detector at a rate of 10 kilohertz. It has been estimated that by 1995 arrays in such systems will have 1 million detectors and multiplexors will sample each detector at a rate of 30 kilohertz. Resulting circuitry will be more susceptible to interference and will consume more electrical power.

Thus, a need exists, which will be critical in the future, for a circuit that produces signals representing intensity of detected infrared radiation in a form that is not susceptible to interference and in a way that does not consume a great deal of electrical power.

FIG. 1a shows a scanning radiation sensor system 20. The sensor system 20 scans space or the Earth for radiation generated from a target by moving a lens 21 together with a plurality of radiation detectors 22, for instance. The lens 21 receives background and target radiation from an instantaneous field of view that is typically one degree horizontal and sixty degrees vertical. The lens 21 collects the background and target radiation and focuses numerous glow spots 23 of radiation toward the radiation detectors 22. Each glow spot 23 of radiation corresponds to a single target or background object, such as a single star in the instantaneous field of view of the lens 21. Each glow spot 23 is slightly larger than one radiation detector. Thus, the lens 21 focuses a glow spot 23 of radiation onto a set of radiation detectors comprising a central radiation detector and any radiation detectors which are immediately adjacent that central radiation detector. The glow spots 23 from numerous targets or background objects move horizontally over the radiation detectors 22 as the sensor system 20 moves the lens 21 together with the radiation detectors 22 left and right in an arc of 120 degrees, and are positioned vertically on the radiation detectors 22 according to the elevation of each target or background object in the field of view, for example. Movement of these glow spots 23 describes a surface known as a focal plane 24.

Typically, modules 22a of radiation detectors 22 are mounted in columns which are staggered vertically on a surface in the focal plane 24 of the moving lens 21. These columns of modules 22a are staggered vertically so that any ray of radiation which might pass undetected through a horizontal space between two vertically adjacent modules in a first column, hits another module in a horizontally adjacent column.

Each radiation detector of each module generates an analog output signal that indicates intensity of radiation detected by such a detector. The analog output signal of each radiation detector is processed in a processor to derive intensity of radiation generated by each target or background object and angular position of that target or object during an initial scan of the glow spots 23 by the lens 21 over the radiation detectors 22. The processor then compares a subsequent intensity of radiation and angular position for each target or object derived during a subsequent scan of the glow spots 23 to determine a trajectory of a target or position of a background object, for instance.

FIG. 1b shows radiation detectors 22 of a scanning radiation sensor system 20 in a line array 25. Typically, line arrays 25 of radiation detectors 22 are mounted in two vertical columns 26 and 27 on a surface in a focal plane 24. The sensor system 20 moves the lens 21 together with the radiation detectors. As a result, glow spots of radiation are scanned horizontally over these two columns 26 and 27. The two columns 26 and 27 of radiation detectors 22 in the line array 25 are staggered so that any ray of radiation, which might pass undetected through a horizontal gap 28 between two adjacent radiation detectors 22 in a first column 26, hits another radiation detector 22 in a second column 27, and is detected. Radiation detectors 22 of each column 27 generate output signals representing intensity of detected radiation.

FIG. 1c shows radiation detectors 22 of a scanning radiation sensor system 20 in a mosaic array 29. Typically, mosaic arrays 29 of radiation detectors 22 are mounted on a surface in a focal plane 24 of the sensor system 20. These mosaic arrays 29 of infrared detectors typically comprise six vertical columns 30, 31, 32, 33, 34, and 35 in each of two array sections 36 and 37. Glow spots of radiation are scanned horizontally over the six columns of one section 36 and then over the other section 37. Radiation detectors 22 of each column generate output signals representing intensity of detected radiation.

A time delay-and-sum circuit, not shown in the figures, incrementally delays sequential output signals from radiation detectors 22 in these six columns until the output signals of radiation detectors 22 in all these six columns are in phase. This delay depends on rotational speed of the lens 21 as it scans and a known angle-separation between columns of adjacent radiation detectors. The delay-and-sum circuit then sums the output signals of these radiation detectors 22 to improve signal-to-noise ratio by the square root of the number of columns. This technique is known as time delay integration. The sections 36 and 37 of the mosaic array are staggered so rays of infrared radiation do not pass undetected through gaps 28 between radiation detectors 22.

FIG. 1d shows radiation detectors of a staring radiation sensor system 20 in a mosaic array 38. Typically, mosaic arrays 38 of radiation detectors 22 are mounted on a surface behind a lens that remains stationary for surveillance of scenes which generate infrared radiation. Such a lens focuses radiation at different angles onto individual radiation detectors 22 of a staring sensor system 20. Output signals from individual radiation detectors 22 are time-integrated to indicate intensity of detected radiation.

The radiation detectors 22 in a sensor system of FIG. 1a, 1b, 1c, or 1d not only detect infrared rays, but also respond to undesirable gamma rays. These detectors produce analog output signals indicating intensity of radiation caused by both types of these rays. Thus, a sensor system for detecting infrared radiation and comprising such radiation detectors 22 must compensate for the presence of undesirable gamma rays.

FIG. 2 shows one type of radiation detector circuit that reduces effects of undesirable gamma rays sensed by a radiation detector. However, this circuit inaccurately indicates intensity of detected radiation. A detector 22 detects infrared radiation and generates an analog output signal that indicates intensity of that radiation to a wide band amplifier 39. This wide band amplifier 39 passes an amplified output signal through a closed switch 40 to an integrator 41. The integrator 41 generates an integrated output signal to a sample-and-hold circuit 42. The sample-and-hold circuit 42 periodically samples the integrator 41 output signal and holds that sample. A multiplexor 43 reads out samples representing detected radiation from a plurality of sample-and-hold circuits 42 in other radiation detection circuits and sends those samples to a processor 44. The processor 44 demultiplexes the samples and derives intensity of detected infrared radiation from these samples. The sample-and-hold circuit 42 also resets the integrator 41 to obtain subsequent samples.

The detector 22 of FIG. 2 generates a gamma spike comprising a high amplitude output signal when the detector 22 detects a gamma ray. The wide band amplifier 39 passes this gamma spike to a differentiator circuit 45. The differentiator circuit 45, on sensing the gamma spike, opens the switch 40 from its closed position to prevent the gamma spike from passing to the integrator 41. However, the open switch 40 also prevents output signals that represent infrared radiation from passing to the integrator 41. Gamma spikes occur frequently, causing this circuit to open frequently and inaccurately detect radiation.

FIG. 3 shows another type of radiation detector circuit that compensates for the presence of undesirable gamma rays, but inaccurately indicates detected radiation. A detector 22 detects infrared radiation and generates an analog output signal that indicates intensity of that radiation to a wide band amplifier 39. This wide band amplifier 39 passes an amplified output signal to an integrator 41. This integrator 41, sample-and-hold circuit 42, multiplexor 43 and processor 44 function the same as those of FIG. 2.

The detector 22 of FIG. 3 generates a gamma spike comprising a high amplitude signal to the wide band amplifier 39 when a detector 22 detects a gamma ray. The gamma spike saturates the wide band amplifier 39 which generates a constant voltage output signal during the gamma spike. The integrator 41 integrates this constant voltage output signal with analog signals which represent detected infrared radiation. Gamma spikes occur frequently, causing this circuit to saturate frequently and inaccurately detect radiation.

The circuits of FIGS. 2 and 3 generate analog output signals to indicate intensity of detected radiation. Such analog signals are very susceptible to interference. Digital signals are less susceptible to interference and are immune to gamma noise, for instance. Multiplexors multiplex digital signals much faster and with greater accuracy than analog signals. Thus, these circuits require analog-to-digital converters to convert these analog signals to digital signals for fast multiplexing without interference. However, analog-to-digital converters consume a great deal of electrical power.

SUMMARY

The invention concerns an apparatus having a means responsive to radiation for producing an output signal related to intensity of detected radiation. The apparatus also comprises a means for quantizing the output signal into a 1-bit signal. This invention significantly reduces the effects of gamma rays and other interference on output signals of infrared radiation detectors with a substantial reduction in electrical power requirements.

It is an object of this invention to effectively suppress gamma spike noise in a circuit for detecting radiation.

It is another object of the invention to reduce the number of wires needed to carry information related to intensity of detected radiation.

It is another object of this invention to reduce the complexity of analog-to-digital electronics used in detecting radiation to conserve electrical power.

BRIEF DESCRIPTION OF THE FIGURES

FIGS. 1a, 1b, 1c, and 1d show arrays of radiation detectors.

FIG. 2 shows a radiation detection circuit having a switch that opens the circuit.

FIG. 3 shows a radiation detection circuit having a wide band amplifier.

FIG. 4a shows a radiation detection circuit having a 1-bit comparator.

FIG. 4b shows waveforms of the FIG. 4a circuit.

FIG. 4c is a flow chart showing processing steps performed by the processor of FIG. 4a.

FIG. 5a and 5b show baseline tracking circuits for the circuit of FIG. 4a.

FIG. 5c shows a radiation detection circuit having a differential circuit including a digital baseline tracking circuit and a plurality of analog baseline tracking circuits.

DETAILED DESCRIPTION OF THE INVENTION

Figure 4C:
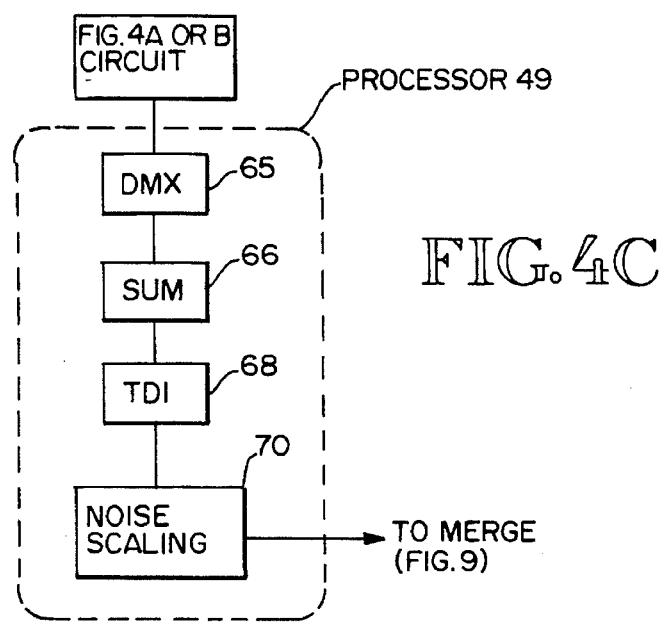

FIG. 4a shows a circuit according to this invention that reduces the effects of undesirable gamma rays. This radiation detector 22 is an example one detector in an array of detectors, such as the array of FIG. 1a, 1b, 1c, or 1d. The radiation detector 22 produces an analog signal that represents intensity of radiation detected by that detector.

A sample-and-hold circuit 54 samples the analog signal from the radiaton detector 22 at a rate of 160,000 samples per second, for instance. This rate is very high compared to a sample rate of 10,000 samples per second taken of a radiation detector in a conventional analog system as is currently used on some aircraft. The sample-and-hold circuit 54 produces an output signal comprising the samples taken of the analog signal from the radiation detector. A 1-bit comparator 46 receives these samples from the sample-and-hold circuit 54 and quantizes each sample into a 1-bit signal which is less susceptible to the effects of interference than an analog signal. The 1-bit comparator 46 uses approximately one tenth the power of an analog-to-digital converter that converts an analog signal to a four-bit signal even though this 1-bit comparator 46 is sampled at a rate sixteen times the rate of an analog-to-digital converter in a conventional analog system, for instance.

Texas Instruments Corporation manufactures 1-bit comparators, such as a TI model No. TL810. These 1-bit comparators receive an unknown potential at a positive input and a reference voltage at a negative input. The 1-bit comparators produce 1-bit signals at a first voltage level when the unknown potential of the positive input is more positive than the reference voltage of the negative input, and produce 1-bit signals at a second voltage level when that unknown potential is more negative than that reference voltage.

The 1-bit comparator 46 of this invention receives an analog output signal indicating intensity of detected radiation from an infrared detector 22 at a positive input and a reference voltage from a baseline tracking circuit 47 at a negative input. This 1-bit comparator produces a 1-bit signal based on a difference between the analog output signal from the radiation detector 22 and the reference voltage from the baseline tracking circuit 47. The 1-bit comparator 46 produces a 1-bit signal at a high voltage level, such as "1", while the the analog output signal of the infrared detector 22 is more positive than the voltage of the baseline tracking circuit 47. The 1-bit comparator 46 generates a 1-bit signal at a low voltage level, such as "−1", while the analog output signal of the infrared detector 22 is more negative than the reference voltage of the baseline tracking circuit 47.

A glow spot of radiation first illuminates a radiation detector 22 at an edge of that detector 22 as a glow spot is scanned over a radiation detector. Such a radiation detector 22 produces an analog output signal that rises from zero, if background radiation is neglected, to a peak when the glow spot illuminates the center of that detector 22, and then falls back to zero. This analog output signal of one radiation detector is a Gaussian signal approximately 4 milliseconds wide. Duration of this Gaussian signal is related to the width of the radiation detector 22 and rotational speed of a scanning lens 21.

FIG. 4b illustrates output signals of elements of the FIG. 4a circuit. FIG. 4b shows a noisy analog output signal 71a that is produced by a radiation detector 22 in response to a relatively constant background radiation.

The 1-bit comparator 46 quantizes the noisy signal 71a from the radiation detector 22 and produces a random series of "1's" and "−1's", with a polarity of each 1-bit depending on whether the noisy signal 71a is greater or less than reference voltage 73a from the baseline tracking circuit 47. For present purposes the noisy signal 71a is considered as having a mean of zero represented by 71b. Then, the series of "1's" and "−1's" shown at 72 are equal. This series 72 is shown as having an equal probability of "1's" and "−1's", in which case the reference voltage 73a is zero.

The radiation detector 22 produces an analog output signal that increases as a glow spot of target radiation is first scanned onto the radiation detector 22. Targets that generate low intensity radiation cause a radiation detector 22 to produce a noisy target signal 74a in response to that low intensity radiation and the relatively high amplitude random noise resulting from background radiation. The low intensity radiation generated by the target increases the analog output signal 71a to the noisy target signal 74a. This increase is shown as occurring instantaneously for simplicity in explaining the function of the FIG. 4a circuit.

The 1-bit comparator 46 compares the noisy target signal 74a from a radiation detector 22 with the reference voltage 73b of the baseline tracking circuit 47. The 1-bit comparator 46 produces a "1" when the noisy target signal 74a from the radiation detector 22 is greater than the reference voltage 73b of the baseline tracking circuit 47. The 1-bit comparator 46 produces a "−1" when the noisy target signal 74a from the radiation detector 22 is less than the increasing reference voltage 73b. Statistically, a target producing a signal-to-noise ratio of 1.0, for instance, has a mean corresponding to 74b, in which case the 1-bit comparator output is 70% "1's" and 30% "−1's", as is explained concerning the chart of FIG. 8. Thus, "1" 72d and "−1" 72e represent that 70% of the 1-bit signals from the 1-bit comparator occurring during time $t_1$ are "1's" and 30% of the pulses are "−1's".

The radiation detector 22 produces an analog output signal that decreases as a glow spot of target radiation is scanned off of the radiation detector 22. This decrease is shown as occurring instantaneously from the noisy target signal 74a back to another noisy background signal comprising random noise 75 with a mean of zero, for simplicity.

The 1-bit comparator 46 compares the noisy background signal 75 with the reference voltage 73c from the baseline tracking circuit 47. The 1-bit comparator produces a "1" 72f or a "−1" 72g depending on whether the noisy background signal 75 is greater or less than the reference voltage 73c, respectively. The baseline tracking circuit 47 integrates this 1-bit series and the reference voltage 73c decreases slowly toward level 73a. Initially the output 72f and 72g of the 1-bit comparator 46 is 48% "1's" and 52% "−1's", for instance. But in the abscence of any new target signals the output of the 1-bit comparator 46 slowly changes to 50% "1's" and 50% "−1's" as represented by 72a and 72b. Although 72a and 72b are shown as periodic to illustrate their probabilities, the occurrence of "1's" and "−1's" is random.

In an infrared sensor system having an array of radiation detectors 22, a plurality of 1-bit comparators 46 separately connect through a plurality of sample-and-hold circuits 54 with a plurality of radiation detectors 22. Each 1-bit comparator 46 produces a 1-bit signal. The multiplexor 48 conveys such 1-bit signals to a processor 49, which derives intensity of detected radiation, for instance. The processor 49 comprises a processor at an earth terminal that communicates with a satellite or a processor on the same airplane as the infrared sensor system, for instance.

FIG. 4c shows a flow chart that illustrates a process for deriving intensity of detected target radiation. The processor 49 of FIG. 4a has a demultiplexor 65 that receives the output from the multiplexor 48 of FIG. 4a and separates the multiplexor output into individual signals comprising quantized samples of output signals from individual radiation detectors 22, for instance.

The processor also comprises a computer which uses a program to derive intensity of detected radiation. The processor first sums at 66 sequential quantized samples in groupings of typically sixteen such samples during a predetermined fraction of the dwell period. This dwell is a time period that is chosen to correspond to the time period a glow spot takes in travelling over the width of a typical radiation detector 22 as that glow spot is scanned over the detector. Thus, dwell depends on rotational speed of the sensor system 20 and the width of a radiation detector 22 in the sensor system 20 of FIG. 1a, for instance.

The processor 49 derives sample values at a rate of four per dwell by summing the groups of sixteen quantized samples. These four sample values per dwell are derived so that intensity of radiation to which a single radiation detector responds can be derived from a train of sample values.

After summing, the processor 49 performs time delay and integration at 68. The processor 49 incrementally delays sequential outputs from detectors in a set of detectors to increase signal-to-noise ratio by the square root of the number of columns. After time delay and integration, the processor performs noise scaling at 70.

The circuit of FIG. 4a responds to a input signal-to-noise ratio. To interpret the signals of FIG. 4a as intensity of detected radiation, noise for each detector channel must be derived and scaled at 70. Noise of each detector channel can be measured directly or the noise of only a few detectors in their circuits can be measured to interpolate noise for other detector channels.

Figure 4D:
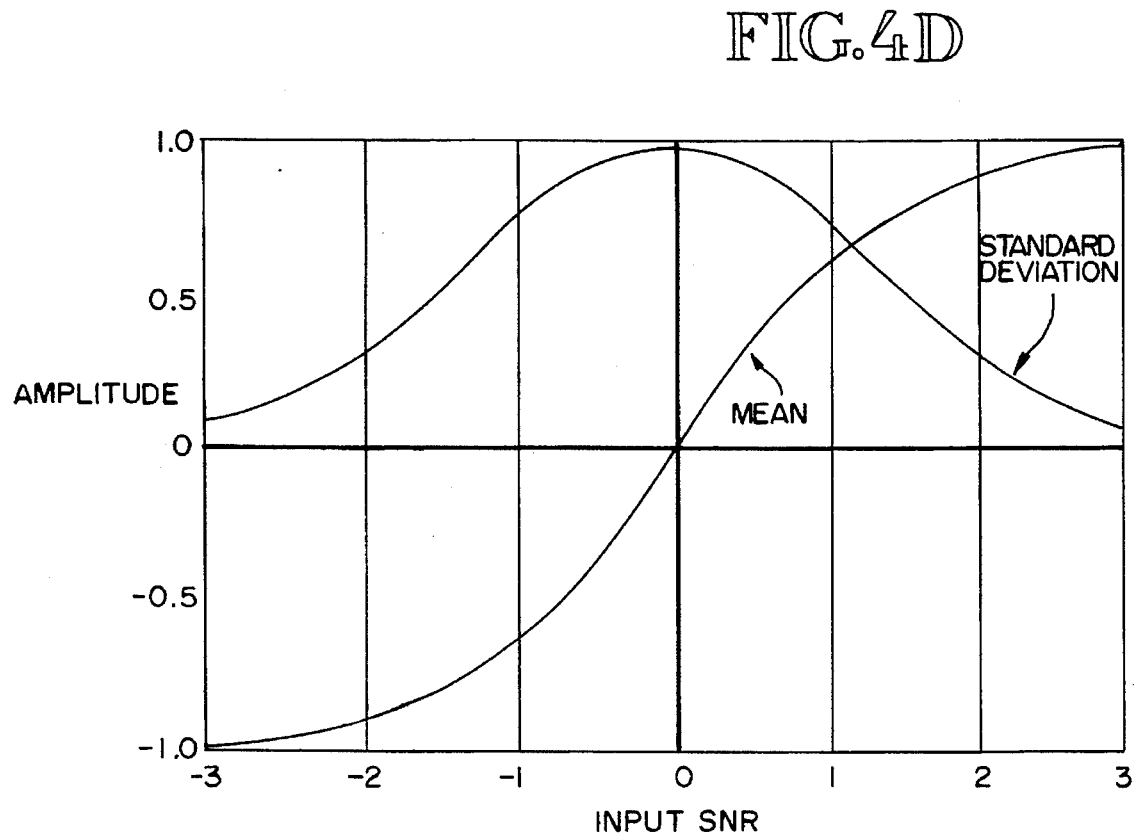
FIG. 4d illustrates deviation of 1-bit signals as a function of input signal-to-noise ratio for the circuit of FIG. 4a, for instance.

FIG. 4d illustrates the theory of Gaussian noise distribution for a detector circuit in general. The amplitude of an averaged voltage for a detector circuit, like an average of 1-bit voltage from a comparator 46a before time delay integration 68, is plotted on the ordinate as a function of input signal-to-noise ratio, which is plotted on the absissa.

FIG. 4d represents the mean and standard deviation of output voltage of the 1-bit signal produced by a 1-bit comparator as a function of input signal-to-noise ratio. The 1-bit comparator tends to saturate and generate all "1's" at high values of signal-to-noise ratio. The standard deviation of the mean reduces as the magnitude of the signal-to-noise ratio increases as indicated by curve.

In the absence of a target, the baseline tracking circuit 47 produces a reference voltage corresponding to background radiation. This reference voltage adjusts to the mean of an output of a detector, and, for example, the 1-bit comparator 46 output may comprise an equal number of high and low 1-bit signals as FIG. 4b illustrates. This equal number gives a mean voltage value of zero and corresponds to an input signal-to-noise ratio of zero if these 1-bit signals are interpreted as +1 and −1 voltage levels.

In the presence of a target, the average of the 1-bit voltage from the comparator 46a before time delay and integration is 0.7, for instance, as is illustrated in FIG. 4b. From the mean curve of FIG. 4d, input signal-to-noise ratio is 1.0, approximately. After noise scaling 70, a merge is performed as discussed concerning FIG. 9.

Noise of the detectors has been measured as discussed above, and input signal-to-noise ratio has been scaled. Thus, the input signal amplitude can be derived from the noise and input signal-to-noise ratio. This amplitude indicates intensity of detected radiation.

Noise can also be measured using a modulated photon radiator. A photon radiator generates radiation towards each radiation detector 22 in an array of detectors 22a. Scaling is performed to derive noise based on a signal representing the modulation of a photon radiator and a signal representing detected radiation.

The detector 22 produces a gamma spike comprising a high amplitude analog signal that lasts about four microseconds when a gamma ray hits and passes through one radiation detector 22. The gamma spike has an amplitude that is much greater than an amplitude of the reference voltage from the baseline tracking circuit 47. Despite the great amplitude of the gamma spike, the 1-bit comparator 46 quantizes the gamma spike into a 1-bit signal of "1" volt or "−1" volt when the gamma spike is more positive or more negative than the reference voltage, respectively. Thus, the multiplexor 48 samples only a 1-bit signal from the 1-bit comparator 46 when this comparator 46 quantizes a gamma spike. The remote processor 49 receives samples of the 1-bit signal corresponding to the gamma spike from the multiplexor 48 and sums these samples with other samples of 1-bit signals that correspond to detected infrared radiation.

Quantizing a noisy signal into a 1-bit signal reduces effective signal-to-noise ratio of the noisy signal by approximately the square root of two. However, this loss in signal-to-noise ratio is small compared to a loss in signal-to-noise ratio that would otherwise result in a high gamma environment.

The 1-bit comparator 46 continually generates 1-bit signals that correspond to detected infrared radiation and 1-bit signals that correspond to the gamma spike to the baseline tracking circuit 47. The baseline tracking circuit 47 comprises an integrator that integrates these 1-bit signals. This baseline tracking circuit 47 generates an analog reference voltage, which represents an average of such 1-bit signals over a long period, to the negative input of the 1-bit comparator 46. The 1-bit comparator 46 compares this reference voltage from the baseline tracking circuit 47 and the analog output signal from a radiation detector 22 and quantizes their difference as discussed above.

FIGS. 5a and 5b show examples of baseline tracking circuits 47. These baseline tracking circuits 47 generate baseline voltages by continually sampling 1-bit signals from the 1-bit comparator 46. FIG. 5a shows an analog baseline tracking circuit. Sequential 1-bit signals from a 1-bit comparator charge the capacitor. The capacitor produces an output voltage that corresponds to the average voltage of the 1-bit signals. The output voltage from this capacitor comprises the reference voltage from the baseline tracking circuit 47. The 1-bit comparator 46 receives this reference voltage at its negative input. The capacitor is likely, however, to discharge if hit by gamma rays, for instance. A time constant of this resistor and capacitor circuit is set to correspond to typically 3,200 detector sample intervals, for a radiation detector in an environment having high background radiation.

FIG. 5b shows a binary baseline tracking circuit. A binary baseline tracking circuit is preferable because binary signals are less susceptible to the effects of gamma noise. An up/down counter 50 tabulates sequential 1-bit signals and adds to the counter 50 a "1" or "−1" depending on whether the 1-bit signals are high or low voltage signals, such as "1" or "−1," respectively. The up-down counter 50 comprises a twelve bit counter that stores a value representing the tabulated sequential 1-bit signals, for instance. The up/down counter 50 outputs its stored value to a digital-to-analog converter 51. The digital-to-analog converter 51 converts the contents of the up/down counter 50 into an analog signal and generates this analog signal as a reference voltage to the negative input of the 1-bit comparator 46. A very occasional sample is taken of the contents of the up/down counter 50 to determine if the 1-bit signal has been distorted by unexpected error sources.

FIG. 5c shows radiation detectors 22 in a differential circuit having one digital baseline tracking circuit 47a and analog baseline tracking circuits 47b and 47c, for instance. The digital baseline tracking circuit 47a produces a reference voltage to negative input of a differential amplifier 76a. A very occasional sample is taken of this digital baseline tracking circuit to determine if the digital value has been distorted by unexpected error sources. A radiation detector 22 produces an analog output signal in response to radiation sensed by that detector to a positive input of the differential amplifier 76a. The differential amplifier 76a produces a difference signal representing a difference between the analog signal from the radiation detector 22 and the reference voltage from the digital baseline tracking circuit 47a. A 1-bit comparator 46a receives this difference signal at one input of that comparator. A second input of the 1-bit comparator 46a is set to zero volts.

Alternatively, a negative input of the 1-bit comparator 46a receives the reference voltage directly from the digital baseline tracking circuit 47a, and a positive input of that comparator receives that analog output signal directly from the radiation detector 22. The circuit of 5c is easier to manufacture as a monolithic circuit on a circuit card if the differential amplifier 76a is used between the radiation detector 22 and the 1-bit comparator 46a for consistency.

It is possible to remove useful analog voltages from the analog difference signals of the differential amplifiers 76a–c. In this manner, the dynamic range of analog signals representing intensity of radiation is reduced, which simplifies multiplexing circuitry used in carrying such analog signals from the differential circuit of FIG. 5c.

The digital baseline tracking circuit 47a produces the reference voltage and differential amplifiers 76b and 76d receive this reference voltage at their negative inputs, for example. These differential amplifiers 76b and 76c receive separate analog output signals from different individual radiation detectors 22. These differential amplifiers 76b and 76c each produce a difference signal representing the difference between an analog output signal from a radiation detector 22 and the reference voltage from the digital baseline tracking circuit 47a. A 1-bit comparator 46b or 46c quantizes the difference signal relative to a reference voltage that an analog baseline tracking circuit produces.

Each radiation detector 22 can have a different responsivity, which causes each radiation detector to produce an analog output signal different from another in response to the same intensity of radiation. These different analog output signals are processed into different quantized signals by the 1-bit comparators 46a or 46b. Each analog baseline tracking circuit 47b or 47c receives different quantized signals and produces a different reference voltage which is an average of those different quantized signals over a long period. Thus, the reference voltage of the analog baseline tracking circuits 47b or 47c relates to the relative responsivity of its associated radiation detector. The relative responsivitiy of the radiation detectors is derived by comparing the reference voltage from the associated analog baseline tracking circuits 47b or 47c with the reference voltage from the digital baseline tracking circuit 47a, for instance.

Figure 6:
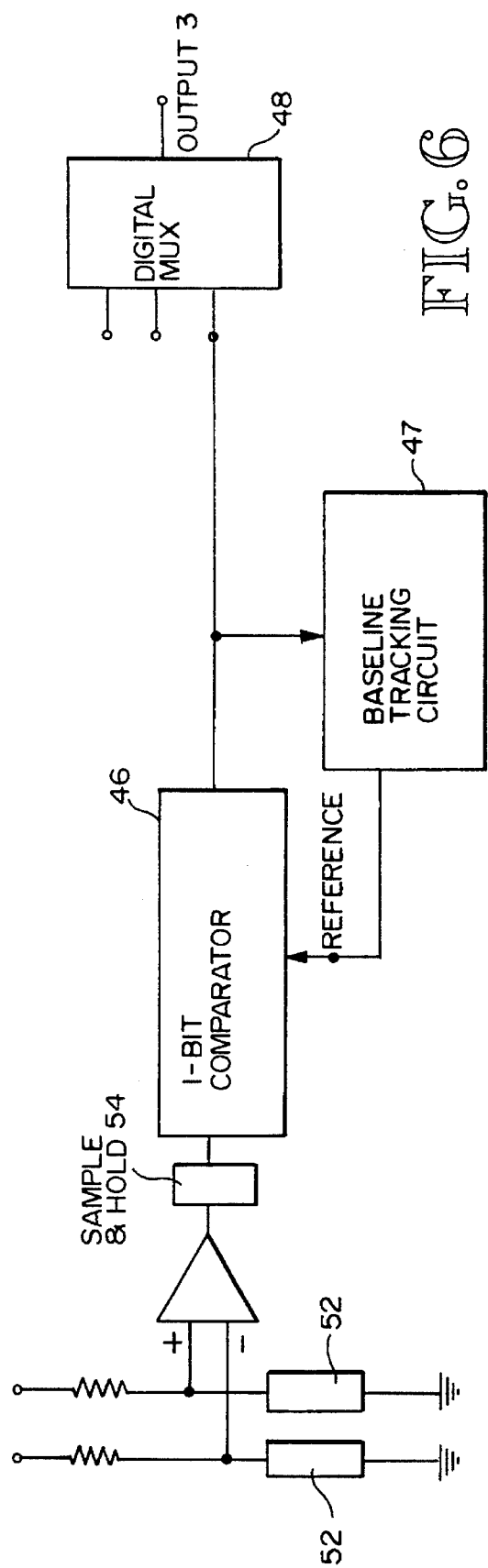
FIG. 6 shows a radiation detection circuit having a pair of detectors, a differential amplifier, and a 1-bit comparator.

FIG. 6 shows a pair of radiation detectors 52 and a 1-bit comparator 46 in a circuit according to this invention. Detectors 52 in pairs cancel most steady state offset signals caused by background radiation.

One detector of the pair 52 connects to the positive input of a differential amplifier 53. The other detector connects to the negative input of the differential amplifier 53. The lens 21 scans a glow spot of radiation sequentially over each detector of a detector pair 52. Thus, one detector of a detector pair 52 receives radiation which is more intense than the radiation the other detector receives. The differential amplifier 53 generates a difference signal that represents the difference in intensity radiation between this pair of detectors 52.

The differential amplifier 53 outputs this difference signal to a 1-bit comparator 46. The 1-bit comparator 46 quantizes the difference signal into a 1-bit signal relative to a reference voltage from a baseline tracking circuit 47. This baseline tracking circuit 47 comprises the circuits of FIGS. 5a or 5b, for instance. The negative input to a 1-bit comparator 46 can be set to "0" if responsivities of a pair of radiation detectors 22 are well matched, which makes a baseline tracking circuit unnecessary. If responsivities of a pair of radiation detectors is plus or minus three percent, the up/down counter 50 can be only eight bits long to conserve electrical power.

The 1-bit comparator 46 generates a binary signal of "1" volt when the difference signal is more positive than the reference voltage, and generates a binary signal of "−1" volt when the difference signal is more negative than the reference voltage. The 1-bit comparator 46 generates a 1-bit signal to a multiplexor 48 that samples the 1-bit signal and multiplexes these samples to a remote processor for deriving intensity of detected infrared radiation the same way as the circuit of FIG. 4.

Figure 7:
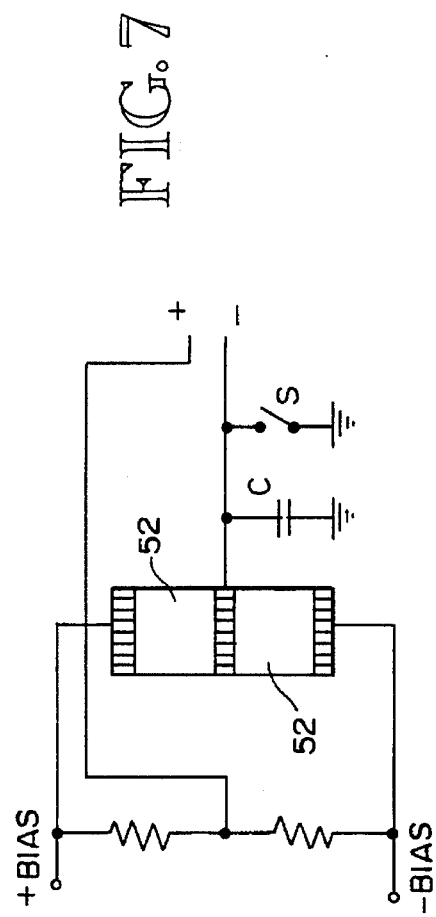
FIG. 7 shows a pair of radiation detectors in a bridge circuit.

FIG. 7 shows a pair of radiation detectors 52 in a bridge circuit. This bridge circuit generates an analog output signal which represents the difference in radiation intensity between these two detectors 52. The 1-bit comparator of FIG. 6 receives this output signal at its positive input and quantizes this output signal relative to reference voltage as discussed concerning the circuit of FIG. 4. Infrared detectors may also be arranged in a quad-detector bridge circuit, for instance.

Figure 8:
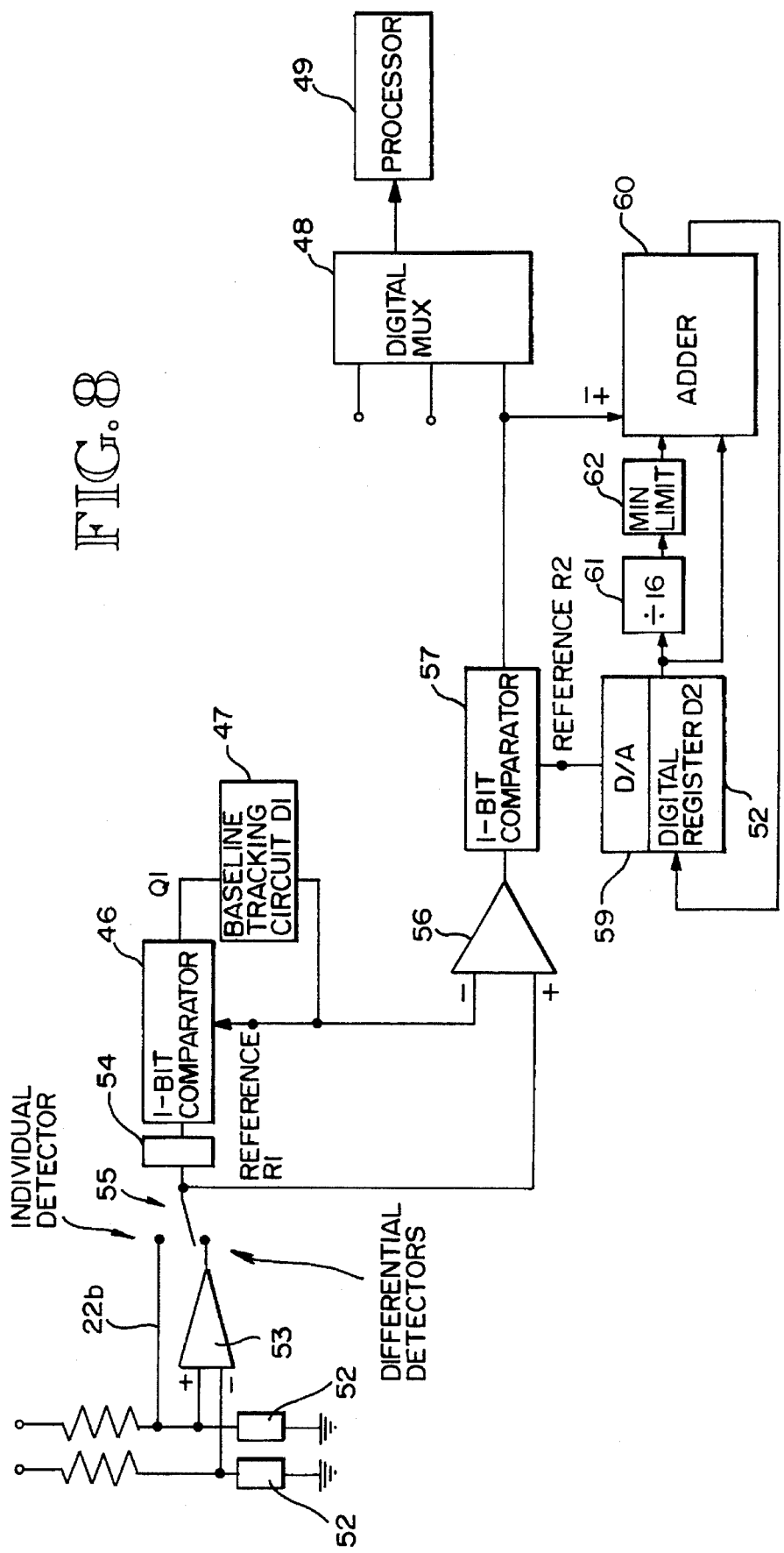
FIG. 8 shows a radiation detection circuit having a 1-bit comparator for detecting high amplitude radiation signals.

FIG. 8 shows a circuit for processing signals having signal-to-noise ratio values greater than 1.6, which cause the 1-bit comparator in FIG. 4a to saturate and continually produce a "1", for instance. This circuit processes high amplitude target information from radiation detectors 22 in an array of radiation detectors. Only one detector in a set of detectors needs to connect to a circuit for processing high amplitude signals. Radiation detectors in such a set are connected so that signals produced by those detectors have outputs that are time-delayed and integrated together. Fewer circuits are needed to handle high amplitude signals because such a high amplitude signal has a gain large enough to not require combining with other signals according to time delay integration techniques.

A switch 55 allows a 1-bit comparator 46 to receive analog output signals from a pair of radiation detectors 52 that connect to the switch 55 through a differential amplifier 53 or to a single radiation detector through the lead 22a. The 1-bit comparator 46 quantizes the output of the pair of infrared detectors 52 or a single detector into a 1-bit signal relative to a reference voltage from a baseline tracking circuit 47 the same as the circuit of FIG. 4a or 6.

The reference voltage from the baseline tracking circuit 47 comprises a signal that represents detected background radiation based on an integration of 1-bit signals from the 1-bit comparator 46 over a long time. The baseline tracking circuit 47 produces this signal representing background radiation, which a negative input of another differential amplifier 56 receives. A detector pair 52 or a single radiation detector 22 produces an analog output signal indicating intensity of detected total radiation comprising background and target radiation, which a positive input of that differential amplifier 56 receives. The differential amplifier 56 generates a difference signal that represents the difference between the reference voltage from the baseline tracking circuit 47 and the analog output signal from the detector pair 52 or single radiation detector 22, for instance. Thus, this difference signal represents target radiation, which is the difference between the reference voltage representing background radiation and the analog output signal representing total radiation.

The 1-bit comparator 46 and the baseline tracking circuit 47 are not required if responsivities of a pair of radiation detectors are well matched. Another 1-bit comparator 57 quantizes the difference signal to a 1-bit signal relative to a reference voltage that a digital register 58 generates.

A digital register 58 holds a value that tracks closely with intensity of infrared radiation that a target generates, for instance. The value in the digital register 58 increases and decreases as fast as changes occur in detected infrared radiation. A digital-to-analog converter 59 converts the value of the digital register 58 into an analog signal. A negative input of the 1-bit comparator 57 receives this analog signal from the digital-to-analog converter 59 as a reference voltage. This reference voltage also increases and decreases as fast as changes occur in detected infrared radiation.

The digital register 58 outputs its full value to an adder 60 for summing and to a divider circuit 61 that comprises a digital shift register which shifts the magnitude of this full value by four bits, for instance. The divider 61 outputs this shifted value to a minimum limit circuit 62. The minimum limit circuit 62 usually outputs the shifted value of the digital register value to the adder 60. The adder 60 sums or subtracts the shifted value with the digital register full value.

The adder 60 also receives 1-bit signals from the 1-bit comparator 57. The 1-bit signals set the sign of the adder 60 to plus if the 1-bit signal is high, or to minus if the 1-bit signal is low. The adder 60 sums the shifted value with the digital register full value if the adder is set to plus. The adder 60 subtracts the shifted value from the digital register full value if the adder 60 is set to minus. The adder feeds back a resulting sum to the digital register 58 as a new value which is held by the digital register 58. Successive new values in the digital register 58 track with changes in intensity of detected infrared radiation.

However, the minimum limit circuit 62 outputs a "1" to the adder 60 for summing, even if the shifted value is "0", for instance. The minimum limit circuit 62 insures that the adder 60 sums or subtracts at least "1" with a digital register value even if the shifted value is "0", so that the digital register 58 and the divider circuit 61 do not both send a "0" to the adder. Otherwise, the adder 60 would sum a "0" from the digital register 58 with a "0" from the divider circuit 58 and would continue to feedback a "0" to the digital register. Thus, the digital register value would not change from "0" and the circuit would not track changes in intensity of radiation.

A multiplexor 48 conveys 1-bit signals from numerous 1-bit comparators to the processor 49. Information concerning amplitude of target radiation is totally contained in the 1-bit signal. A very occasional sample is taken of the digital register 58 to determine if the 1-bit signal has been distorted by unexpected error sources. Based on the stored value from the digital register 58 and the samples from the multiplexor 48, the amplitude of infrared radiation generated by a target can be derived in this processor 49.

Figure 9:
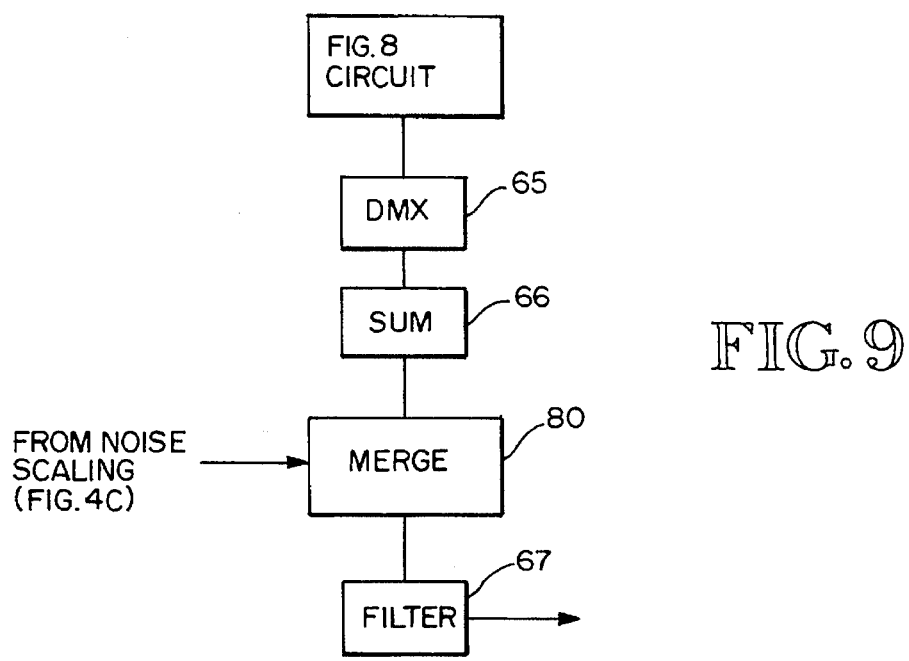
FIG. 9 is a flow chart showing processing steps performed on the signals from the circuit of FIG. 8.

FIG. 9 illustrates processing steps performed in the processor in deriving intensity of detected radiation for high amplitude signals from the FIG. 8 circuit. The processor 49 demultiplexes at 65 the multiplexed 1-bit signals from numerous 1-bit comparators and then sums groupings of sixteen 1-bit signals as discussed concerning FIG. 4d. Time delay and integration and noise scaling is not necessary for high amplitude signals. After summing at 66, a merge 80 is performed of signals from the high amplitude circuit of FIG. 9 and the signals from the low amplitude circuit of FIGS. 4a or 6. During this merge, a determination is made whether 1-bit comparators in low amplitude circuits of FIG. 4a or 6 are saturated and are producing mostly "1's" or "−1's". If these comparators are saturated, the processed signals from the high amplitude circuit are filtered at 67. These processed signals indicate high intensity of detected radiation. However, if these comparators are not saturated, processed signals from the low amplitude circuit are filtered at 67. These processed signals indicate low intensity of detected radiation. The filtering of step 67 comprises match-filtered weighting. The processor 49 weights derived values from time delay and integration with characteristics of a Gaussian signal, such as an analog output signal from a radiation detector responding to target radiation.

Figure 10:
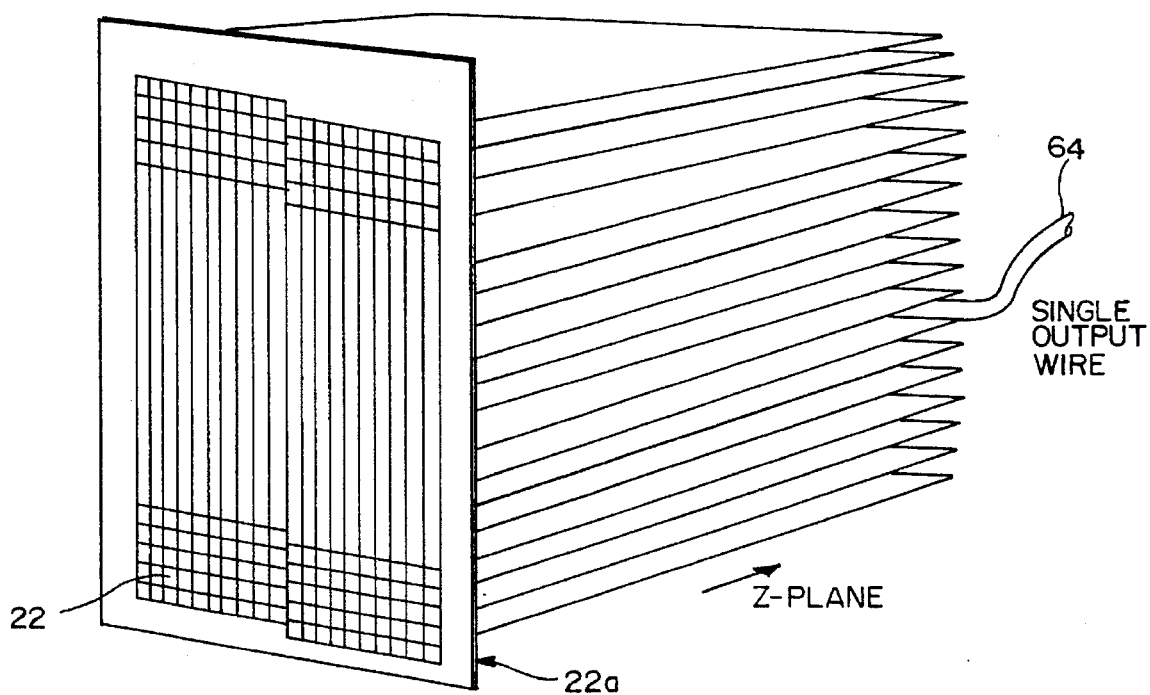
FIG. 10 shows a detector module with Z-plane electronics.

FIG. 10 shows a sketch of a detector module 22a comprising typically twenty columns of detectors 22 with typically thirty-two detectors per column. A multiplicity of such modules 22a are mounted in the focal plane 24 of FIG. 1a. A 1-bit comparator 46 is mounted in the Z-plane directly behind each radiation detector 22 mounted in a focal plane. A 1-bit comparator 46 is a monolithic circuit on a circuit card and is bump-bonded directly to a radiation detector 22. Bump-bonding is a technique which has been in use by the electronics industry in constructing Z-plane electronics. Z-plane electronics and 1-bit quantizing allow the signal information from all 640 detectors to be multiplexed at 100 Megahertz over a single output wire 64.

Figure 11:
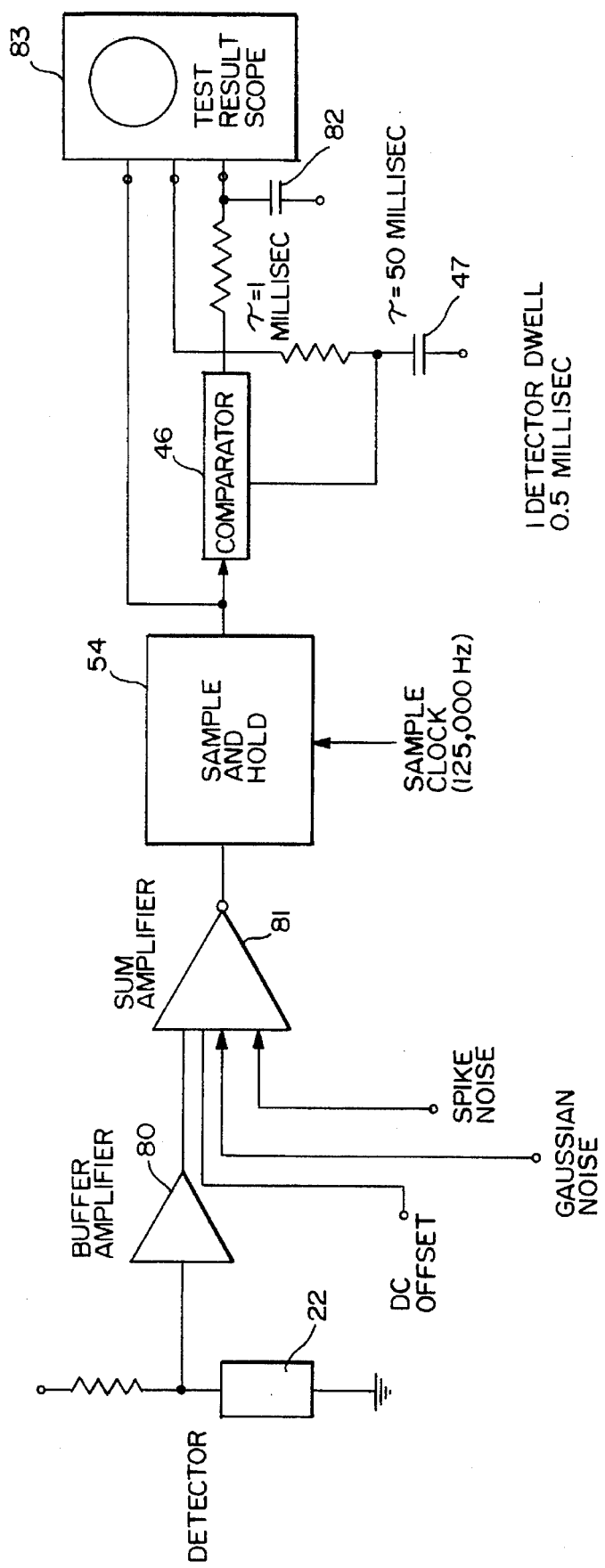
FIGS. 11 shows a schematic diagram of an apparatus used in testing a prototype of the FIG. 4a chart.
Figure 12A:
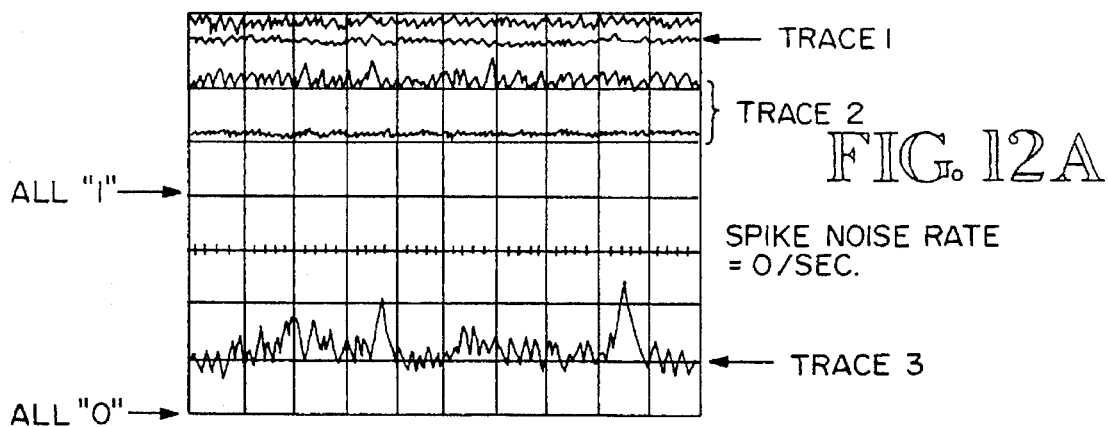
FIGS. 12a–c illustrate process signals from the circuit of FIG. 11.
Figure 12B:
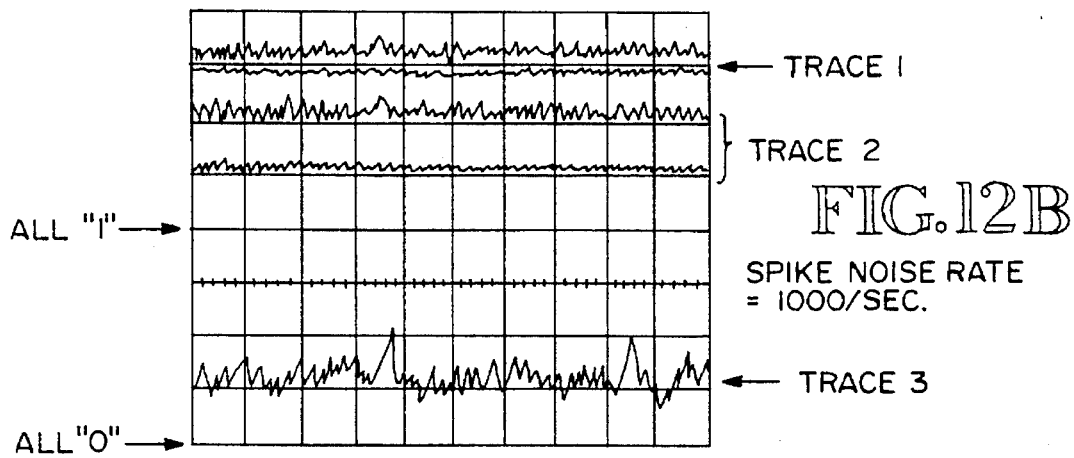
Figure 12C:
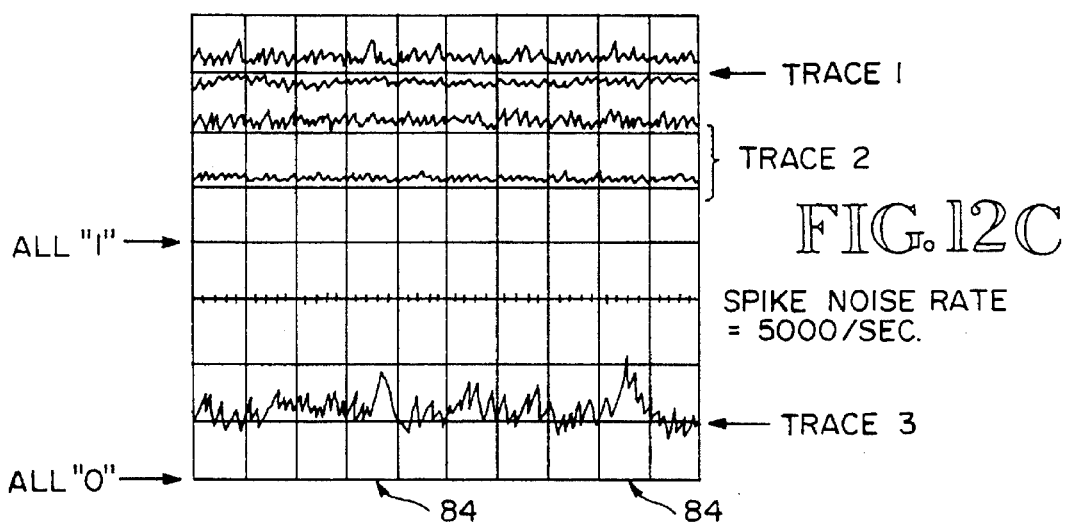

FIG. 11 is a block diagram that represents an apparatus used in testing a prototype of this invention. A TEK 556 Oscilloscope, not shown in the Figures, having a super fast phosphor was used to simulate the generation of radiation. This oscilloscope sweeps a synthesized target through a lens, not shown in the Figures, and across a single radiation detector 22. The radiation detector produces an analog output signal in response to the target spot. A buffer amplifier 80 filters and amplifies the analog output signal from the radiation detector 22. A sum amplifier 81 receives the amplified analog output signal, along with electronically produced Gaussian noise, spike noise and a direct current offset signal. The sum amplifier sums the amplified analog output signal with the Gaussian noise and spike noise and produces an output signal that represents the output of a radiation detector in a high noise environment. The offset signal provides a more dynamic range of signal amplitude for tracking high amplitude targets by shifting the analog output signal towards 0 volts, as shown in FIGS. 12*a–c*. A sample-and-hold circuit 54 samples the output signal from the sum amplifier 81 at a rate of typically 125,000 samples per second. The sample-and-hold circuit 54 produces samples that the 1-bit comparator quantizes into 1-bit signals. A resistor and capacitor circuit having a time constant of 50 milliseconds comprises an analog baseline tracking circuit 47 which integrates the 1-bit signals over a long time. Another resistor and capacitor circuit 82 having a 1 millisecond time constant integrates the 1-bit signals and produces an output signal to an oscilloscope 83 which displays the output of this circuit having a 1 millisecond time constant.

FIGS. 12*a*, 12*b*, and 12*c* show the output of the oscilloscope 83 of FIG. 11. These Figures plot amplitude of a signal on the ordinate as a function of time which is plotted on the abscissa. Trace 1 shows a repetitive target buried in noise, a signal-noise-ratio of 1.0, with two target pulses viewed in each trace. Trace 2 of each FIG. 12*a*, 12*b*, and 12*c* shows the quantized output of the 1-bit comparator. Trace 3 of these figures shows the output signal from the resistor and capacitor circuit having a time constant of 1.0 milliseconds. Trace 3 has been shifted towards 0 volts by a direct current offset signal to provide a more dynamic range of signal amplitude. FIG. 12*a* shows these traces with no spike noise. FIG. 12*b* shows these traces with 1000 spikes added per second. FIG. 12*c* shows these traces with 5000 spikes added per second. Trace 3 of these figures clearly shows the target responses as two peaks 84 even in the very noisy environment of 5000 spikes per second.

FIG. 13*a*–15*d* show output wave forms of several infrared scanning sensor systems including conventional spike adaptive time delay integration systems and 1-bit quantized systems according to this invention. These waveforms were produced by simulating the scanning of a pair of infrared targets in environments containing varying amounts of gamma radiation. All of the waveforms show amplitude plotted on the ordinate and the time plotted on the abscissa and were smoothed by a target matched filter. These records were generated using a computer program that simulates the processing steps of a conventional time delay integration sensor system or a 1-bit sensor system having circuits according to this invention. This computer program is labelled Appendix I. FIGS. 13*a*–13*d* show no gamma spikes per dwell, FIG. 14*a*–14*d* show two gamma spikes per dwell and FIG. 15*a*–15*d* show ten gamma spikes per dwell.

Figure 13B:
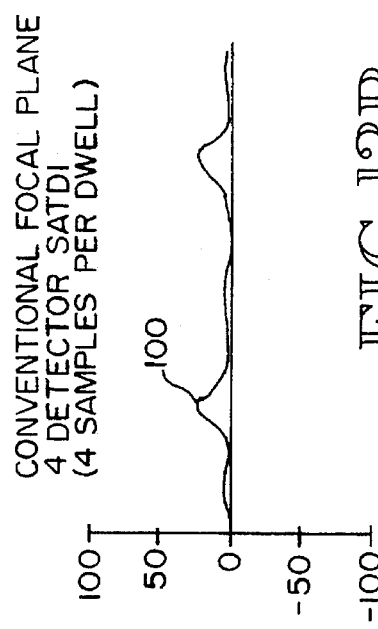
FIGS. 13a–d, 14a–d, and 15a–d illustrate computer simulated results comparing outputs of conventional spike adaptive time delay integration circuits to simulations of the FIG. 4a and 6 circuits.
Figure 13D:
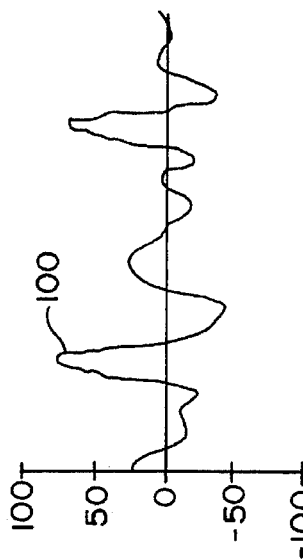
Figure 13A:
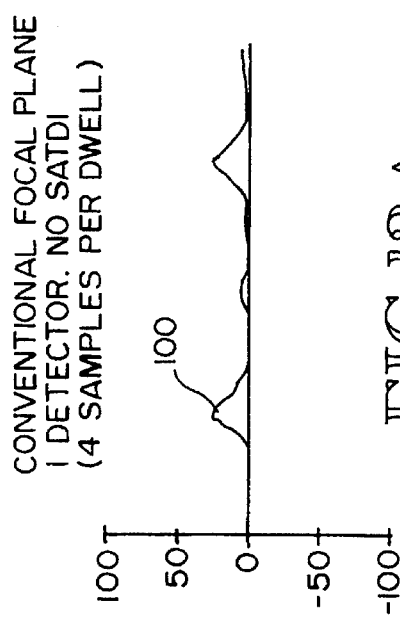
Figure 14B:
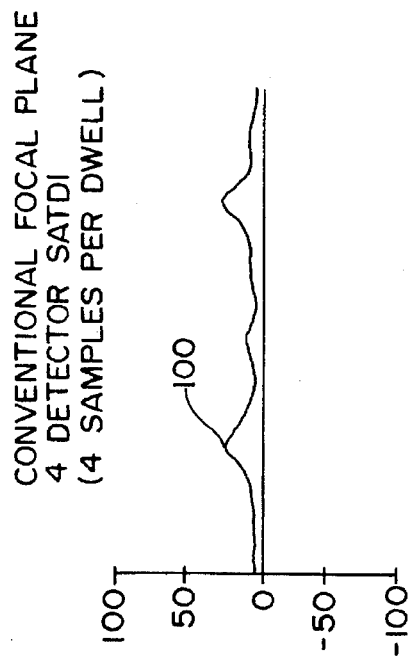
Figure 14D:
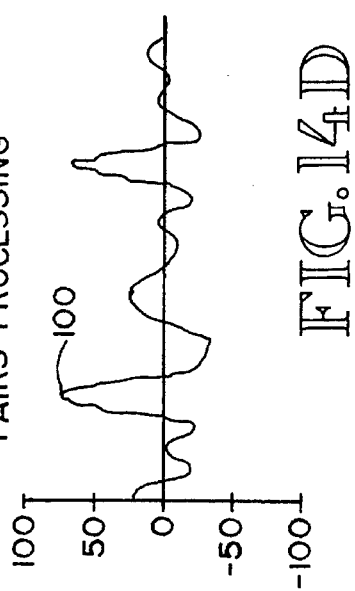
Figure 14A:
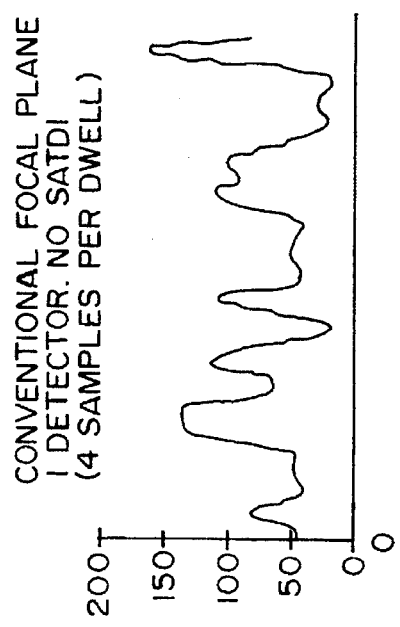
Figure 15B:
Figure 15D:
Figure 15A:

FIGS. 13*a*, 13*b*, 14*a*, 14*b*, 15*a*, and 15*b* were generated using a computer program that simulates the processing steps of a conventional time delay integration sensor which samples each detector at a rate of 4 samples per dwell and processes those samples through a 4 detector spike adaptive time delay integration gamma suppression algorithm. The input signal-to-noise ratio was set at 6.0. FIGS. 13*a*, 14*a*, and 15*a* show the output waveforms prior to processing with the spike adaptive time delay integration gamma suppression algorithm. FIGS. 13*b*, 14*b*, and 15*b* show the output waveforms after processing by the algorithm.

Figure 13C:
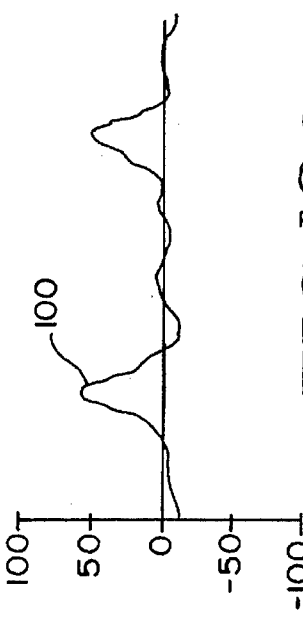
Figure 14C:
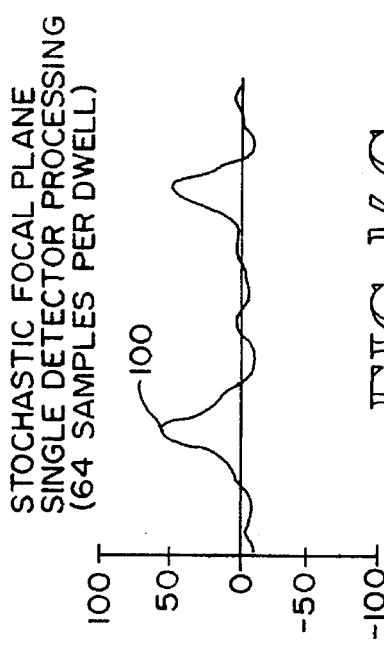
Figure 15C:
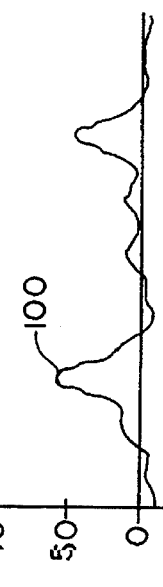
Figure 16A:
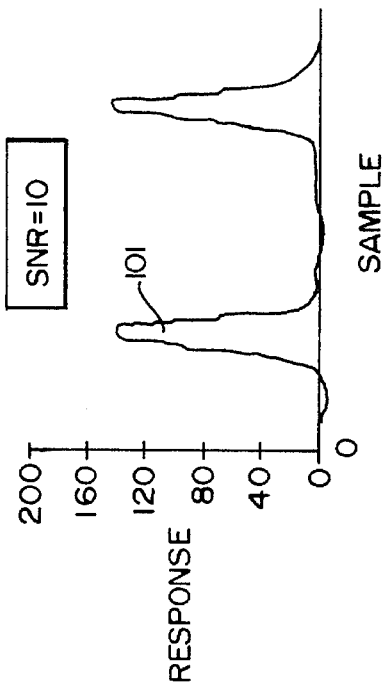
FIG. 16 illustrates the processing of signals with the circuit of FIG. 8.
Figure 16B:
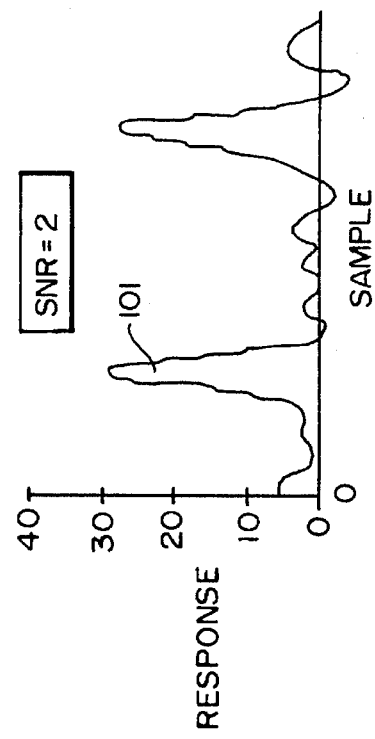
Figure 16C:
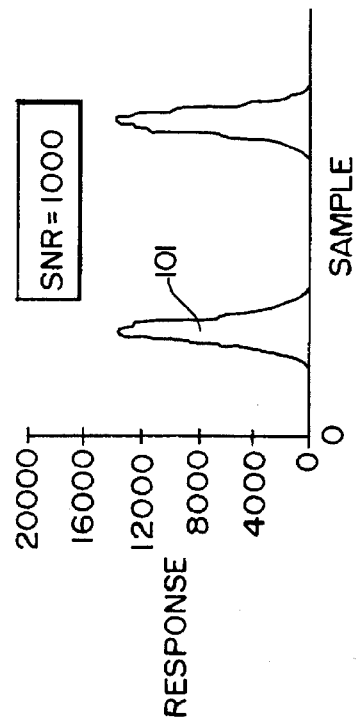
Figure 16D:
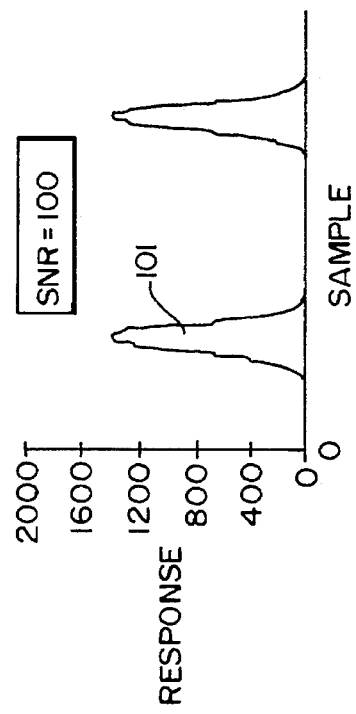

FIGS. 13*c*, 14*c*, and 15*c* were generated using a computer program that simulates the processing steps of 1-bit sensor systems, according to the present invention having a single detector as in FIG. 4*a*. FIGS. 13*d*, 14*d*, and 15*d* were generated using a computer program which simulates the processing steps of a 1-bit sensor system, according to the present invention, having a differential detector as in FIG. 6. Both simulated 1-bit sensor systems sample each detector at 64 samples per dwell, 1-bit quantize the samples relative to a simulated resistor and capacitor baseline reference circuit having a time constant of 50 dwells, and then sum the 1-bit quantized samples in groups of 16 to get 4 samples per dwell. The input signal-to-noise ratio for both 1-bit sensor systems was set at 1.5. The waveforms of FIGS. 13*c*, 13*d*, 14*c*, 14*d*, 15*c*, and 15*d* were not processed with the spike adaptive time delay integration gamma suppression algorithm.

The programs tested the conventional time delay and integration sensor system and the 1-bit sensor systems at three different gamma spike noise event rates. In an environment free of gamma radiation, that is, an environment in which there are zero gamma spike noise events per dwell, the simulated conventional sensor system and 1-bit sensor systems succesfully identified the positions and amplitudes of the pair of infrared targets as indicated by peaks 100 in FIG. 13*a*–13*d*.

In a low gamma environment having two gamma spike noise events per dwell, the simulated conventional sensor system without the spike adaptive time delay integration gamma suppression algorithm was unable to identify the positions and amplitudes of the infrared targets as shown in FIG. 14*a*. The conventional sensor system with the spike adaptive time delay gamma suppression and the 1-bit sensor systems were able to successfully identify the positions and amplitudes of the targets as indicated by peaks 100 in FIGS. 14*b*, 14*c*, and 14*d*.

In a high gamma environment having ten gamma spike noise events per dwell, the conventional sensor system failed to satisfactorily process the signals produced by the infrared targets either prior to or after processsing by the spike adaptive time delay integration gamma suppresssion algorithm as shown in FIGS. 15*a* and 15*b*, respectively. In contrast to the conventional systems, the simulated 1-bit sensor systems of the present invention were able to successfully identify the positions and amplitudes of the infrared targets as shown by peaks 100 in FIGS. 15*c* and 15*d*.

These time records show that in a high gamma environment, 1-bit processing of a single detector or detector pair gives better results than does processing with four spike adaption time delay integration detectors. These results are clear from the peaks corresponding to target radiation, which are easily recognizable after 1-bit processing according to this invention.

FIGS. 16a–16d show time records which were derived in processing high amplitude targets through a computer simulation of the high amplitude target processing design shown in FIG. 9. The computer program labelled Appendix IV illustrates this simulation. Satisfactory target tracking occurs over a very wide range of target amplitudes. FIGS. 16a–16d show the output amplitude of the 1-bit sensor system as a function of scanning time for target signal-to-noise ratios of 2, 10, 100, and 1000, respectively. The program simulated the scanning of a pair of infrared targets which produce Gaussian shaped waveforms. The simulated 1-bit sensor system having the high amplitude processing circuit of FIG. 9 successfully indicated the position and amplitude of the pair of infrared targets for all of the target amplitudes as shown by peaks 101 in the waveforms of FIGS. 16a–16d.

Appendix I is a computer program that simulates 1-bit quantizing of a noisy signal for a single detector and a differential pair of detectors according to this invention. Appendix II is a computer program that simulates conventional time delay integration. Appendix III is a subroutine that simulates match-filtered weighting. Appendix IV is a program that simulates 1-bit quantizing of a high amplitude signal for a single detector and a differential pair of detectors according to this invention.

The programs and subroutine of Appendices I–IV were used in simulating the concept of this invention. The programs of Appendices II and III must be modified to process in real-time in an actual infrared sensor system. Programs for performing time delay integration and match-filtered weighting in real-time are currently used in conventional analog sensor systems aboard aircraft, for instance.

The concepts of this invention also apply to staring sensors and to imaging sensors. These sensors process single radiation detectors in preference to differential radiation detector pairs, and use somewhat lower sample rates, depending on gamma environment. Imagery is represented by a combination of a 1-bit signal and occasional sampling of the digital register 50 of FIG. 5B, for instance.

The concept of this invention is not limited to radiation detectors which are responsive only to wavelengths of radiation in the infrared band. The concept of this invention is applicable to radiation detectors comprising photocells which are responsive to wavelengths of radiation in the visible band, for instance. The concept of this invention is applicable to cryogenically cooled detectors and room temperature detectors used in such applications as object detection and tracking, earth resources surveillance, and weather satellites.

APPENDIX I

```
      program stochastic_focal_plane
c
c     12 February, 1988
c
c     Written by:  Paul N. Michels
c
c        This program simulates a one-dimensional LWIR scene sampled from a
c     "Stochastic Focal Plane" (SFP), and consists of target responses amid a
c     nuclear background. Two SFP configurations simulated: 1) single detector
c     with baseline track feedback and 2) differential paired detectors.
c
         Real tdi_x(256,4), sfp_a(4096,4), sfp_b(256,4),
     1     sfp_dd(256,4),sfp_b2(256,4), gc_tdi(256), gc_sfp(256), gc_sfp2(256),
     1     tdi_x_mf(256,4), gc_tdi_mf(256,1), gc_sfp_mf(256,1),gc_sfp2_mf(256,1),
     1     sfp_b_mf(256,4), sfp_dd_mf(256,4), temp_store(256,4),
     1     pi, sample_rate, dwell, tgt_width, tempt, tempb,
     1     gamma_rate, gamma_height, photon_rms,
     1     dc_bkgnd, bkgnd_mean, bkgnd_rms, corlen,
     1     first_targ, targ_separation, first_targ2, targ_separation2,
     1     jitter_rms, velocity, alpha, thold, thold_sfp
         Integer n_tdi, n_x_scan, n_inscan, n_colors, iseed, kount, mfkount,
     1     bp_gammas, n_inscan2, n_dd_sep, n_tdi_dd, one
         Character*9 today
         Logical doublet_sfp one = 1
         pi = acos(-1.0)
         doublet_sfp = .false.       ! boolean variable to determine whether
c                to perform differential paired detector SFP is performed
c                or single detector SFP w/baseline tracking.
c
c  Input Parameters
c
         n_tdi          = 4             ! tdi channels
         n_inscan       = 256           ! in scan samples
         n_x_scan       = 1             ! cross scan samples
         n_colors       = 1             ! colors
         dc_bkgnd       = 0.0           ! DC background level
         corlen         = 400.0         ! clutter correlation length in time samples
         bkgnd_mean     = 0.0           ! mean of clutter background
         bkgnd_rms      = 0.0           ! rms of clutter background
         photon_rms     = 1.0           ! rms of photon (white) gaussian noise
         gamma_rate     = 2.5           ! average events per sample @ 4/dwell
         gamma_height   = 20.0          ! average height per gamma event
         readout_rms  = photon_rms * 0.0
         tgt_amp        = 6.0           ! target amplitude
         first_targ     = 40.0          ! position of first target
         targ_separation = 40.0         ! separation (in samples) between targets
         dwell          = 4.0           ! samples per dwell
         sample_rate    = 4.0           ! samples per dwell
         tgt_width      = 2.0           ! width (in samples) of targets
         jitter_rms     = 0.0           ! RMS of jitter white noise
         velocity       = 0.0           ! target displacement between detectors
         bpgammas       = 0             ! bipolar gamma flag
                                        !     0 = only positive gammas
                                        !     1 = positive & negative gammas
         alpha = 50.0 * 64.0            ! time constant for SFP baseline tracking
                                        no. of samples at high SFP sample rate
         iseed = 5e7+13
c
c  Create 64 per dwell sampled responses
c
         tgt_amp2 = tgt_amp / 16.0      ! necessary conversions from
         tgt_width2 =  32.0             ! 4/dwell to 64/dwell samples
```

```
            first_targ2 = 100.0*16.0
            targ_separation2 = 50.0*16.0
            photon_rms2 = photon_rms / 4.0
            gamma_rate2 = gamma_rate / 16.0
            n_inscan2 = n_inscan * 16
            n_int = 16 ! number of samples to integrate to get 4 samples per dwell call generate_1d_data( sfp_a,
     1                  n_tdi, n_inscan2, n_x_scan, n_colors,
     1                  dc_bkgnd, corlen, bkgnd_mean, bkgnd_rms,
     1                  tgt_amp2, tgt_width2, first_targ2, targ_separation2,
     1                  jitter_rms, jitter_period, velocity, photon_rms2,
     1                  gamma_rate2, gamma_height, bp_gammas,
     1                  iseed )           ! 20 arguments
c
c     Integrate 64/dwell samples in the Stochastic Focal Plane Method
c
c        a) single detector w/baseline tracking circuit
            call sfp_blt( sfp_a, sfp_b, n_tdi, n_inscan2, n_inscan, n_int,alpha )
c        b) doublet detector SFP
            n_dd_sep = ifix(tgt_width2 * 3) ! 1.5 dwells separation
            call sfp_2det( sfp_a,sfp_dd,n_tdi,n_inscan2,n_inscan,n_int,n_dd_sep )
            n_tdi_dd = n_tdi / 2
c
c     "-1 ...^... +1" filter to compensate for differentiated target shape
c
            do j=1, n_tdi_dd
               do i=4, n_inscan-3
                  temp_store(i,j) = sfp_dd(i+3,j) - sfp_dd(i-3,j)
               enddo
               do i=4, n_inscan-3
                  sfp_dd(i,j) = temp_store(i,j)
               enddo
            enddo
            n_tdi_sfp = n_tdi
c
c     Simulate CONVENTIONAL sampling of 4/dwell by integrating 16
c     samples simulated at 64 per dwell
c
            do j=1, n_tdi
               temp = 0.0
               k = 0
               k2 = 0
               do i=1, n_inscan2
                  temp = temp + sfp_a(i,j)
                  k = k + 1
                  if( k .eq. n_int ) then
                     k2 = k2 + 1
                     tdi_x(k2,j) = temp
                     temp = 0.0
                     k = 0
                  endif
               enddo
            enddo
c
c     Gamma Circumvention (SATDI) on conventional sampled frame
c
            thold = photon_rms * 4.0
            call satdi( tdi_x, n_inscan, n_tdi, gc_tdi, thold )
c
c     Gamma Circumvention (SATDI) on SFP sampled frame
c
            thold_sfp = thold * 2
            call satdi( sfp_b, n_inscan, n_tdi_sfp, gc_sfp, thold_sfp )
```

```
        call satdi( sfp_dd, n_inscan, n_tdi_dd, gc_sfp2, thold_sfp )
c
c  Target Response Match Filtering
c
        call match_filter( tdi_x,   tdi_x_mf,   n_inscan, n_tdi, tgt_width)
        call match_filter( gc_tdi,  gc_tdi_mf,  n_inscan, one,   tgt_width)
        call match_filter( gc_sfp,  gc_sfp_mf,  n_inscan, one,   tgt_width)
        call match_filter( gc_sfp2, gc_sfp2_mf, n_inscan, one,   tgt_width)
        call match_filter( sfp_b,   sfp_b_mf,   n_inscan, n_tdi, tgt_width)
        call match_filter( sfp_dd,  sfp_dd_mf,  n_inscan, n_tdi, tgt_width)
c
c  Write output listing - Consisting of simulation description plus sampled
c  data listed in seven columns: sample index, single detector conventional
c  sampling, SATDI conventional samples, SFP baseline track configuration
c  before and after SATDI, and SFP differential paired detectors before
c  and after SATDI.
c
        call date( today )
        open( unit=1, file='[michels.stochastic_focal_plane]sfp.dat',
     1        type='new', recl=130, carriagecontrol='list' )
        write(1, '( //, '' IR Data Digital Signal Processing Simulation'',25x,
     1             a9 )')today
        write(1, '(      '' Stochastic Focal Plane '' )')
        write(1, '( i3, '' Detectors '' )' ) n_tdi
        write(1, '( '' Initial Settings @ 4 per dwell '', / )' )
        write(1, '( '' Target Amplitude    = '', f6.2 )' ) tgt_amp
        write(1, '( '' Photon RMS          = '', f6.2 )' ) photon_rms
        if( bpgammas .eq. 1 ) then
            write(1, '( '' Bipolar Gammas '' )' )
        else
            write(1, '( '' Positive Amplitude Gammas '' )' )
        endif
        write(1, '( '' Mean Gamma Rate (per sample) = '', f6.2 )' ) gamma_rate
        write(1, '( '' Mean Gamma Height            = '', f6.2 )' ) gamma_height
        write(1, '(x, /,
     1            ''index one det.   SATDI(4)      '',
     2            ''SFP-blt    SATDI(4)     SFP-dd    SATDI(2)'')' )
        jth_det = 1
        do i=75, 174                    ! 1, n_inscan
           write(1, '( x, i3, 6(2x, f9.3) )' ) i-75, tdi_x_mf(i,jth_det),
     1        gc_tdi_mf(i,1), sfp_b_mf(i,jth_det), gc_sfp_mf(i,1),
     2        sfp_dd_mf(i,jth_det), gc_sfp2_mf(i,1)
        enddo
        close(1)

END include '[michels.toolbox]data_sim_1d.sub'
        include '[michels.stochastic_focal_plane]sfp_blt.sub'
        include '[michels.stochastic_focal_plane]sfp_2det.sub'
        include '[michels.toolbox]satdi.sub'
        include '[michels.toolbox]match_filter.sub'
```

APPENDIX II

```
      subroutine satdi( rinput, inscan, ntdi, output, thold)
c
c  Spike-Adaptive Time Delay Integration
c
c    The time aligned detector samples are averaged...
c
c  Input:     ntdi                      : number of TDI elements
c             inscan                    : number of inscan time units
c             rinput(inscan, ntdi)      : input data array
c
c  Output:    output(inscan)            : output data array
c
c             Note : the TDI index of the data array is lost after TDI
c
c  Algorithm: After the time delays are used to align the TDI detector
c             waveforms, all the TDI group samples within the threshold
c             of the lowest are averaged.
c
      dimension  rinput(inscan,ntdi), output(inscan)

integer  i, j, inscan, ntdi
      real     tdi_low, thold, count, sum do k = 1, inscan
c
c  find minimum of ntdi samples
c
          tdi_low = rinput(k,1)
          do i=2, ntdi
              tdi_low = min( tdi_low, rinput(k,i) )
          enddo
c
c  average all samples within thold of minimum (tdi_low)
c
          sum = 0.0
          count = 0.0 do i = 1, ntdi
              if( abs(rinput(k,i) - tdi_low) .le. thold ) then
                      sum = sum + rinput(k,i)
                      count = count + 1.0
              endif
          enddo output(k) = sum / count enddo    ! next k return
      end
```

APPENDIX III

```
      subroutine match_filter( rinput, output, ninscan, ntdi, twidth )
c
c  This subroutine applies a uniform-height (width inputted) target-matched
c  filter to the input data array.  Resulting data is returned in the output
c  array.
c
c  Input:
c        rinput    - input data array to be filtered
c        ninscan   - number of samples in the inscan direction
c        ntdi      - number of tdi detector samples for each inscan sample
c        twidth    - width of uniform target needed to derive match filter
c  Output:
c        output    - match filtered input data dimension rinput(ninscan,ntdi), output(ninscan, ntdi)
      real twidth, filter(11), x, temp
      integer ninscan, ntdi, i, j, k c
c  Assign weights to the filter - five points on either side of the mean
c  corresponding to five samples taken from a uniform target gaussian shape.
c
      x = -6.0
      do i=1, 11
         x = x + 1.0
         filter(i) = exp( - (x*x) / (2.0 * (twidth*twidth)) )
      enddo c
c  Apply filter to the input data - center the 11 point filter about
c  the current input sample and weight the five samples to either side of it,
c  multiplying the weights by the input samples.  The output response is the
c  sum of the 11 weighted samples.
c c     - end samples are set equal to input do j=1, ntdi
         do i=1, 5
            output(i,j) = rinput(i,j)
         enddo
         do i=ninscan-4, ninscan
            output(i,j) = rinput(i,j)
         enddo
      enddo do j=1, ntdi
         do i=6, ninscan-5
            temp = 0.0
            do k=1, 11
               temp = temp + rinput(i+k-6,j) * filter(k)
            enddo
            output(i,j) = temp
         enddo
      enddo return
      end
```

APPENDIX IV

```
      program sfp_big_tgts
c
c  12 February, 1988
c
c  Written by:  Paul N. Michels
c
c       This program simulates a one-dimensional LWIR scene sample from the
c  "Stochastic Focal Plane" high amplitude tracking configuration and consists
c  of target responses amid a nuclear background.
c
      Real tdi_x(256,4), sfp_a(4096,4), sfp_b(4096,4),
     1   sfp_b2(256,4), sfp_m1(256,4), post_tdi(256), gc_sfp(256),
     1   pi, sample_rate, dwell, tgt_width, tempt, tempb,
     1   gamma_rate, gamma_height, photon_rms,
     1   dc_bkgnd, bkgnd_mean, bkgnd_rms, corlen,
     1   first_targ, targ_separation, first_targ2, targ_separation2,
     1   jitter_rms, velocity,
     1   alpha, thold, thold_sfp,
     1   bit, temp, delta, xscale, sigdelta, temp2,
     1   tgt_amps(4), sfp_snr(256,4)

Integer n_tdi, n_x_scan, n_inscan, n_colors, iseed, kount, mfkount,
     1        bp_gammas, n_inscan2, n_int, jtgt Character*9 today pi = acos(-1.0)
c
c  Input Parameters
c
      n_tdi        = 1              ! tdi channels
      n_inscan     = 256            ! in scan samples
      n_x_scan     = 1              ! cross scan samples
      n_colors     = 1              ! colors
      dc_bkgnd     = 0.0            ! DC background level
      corlen       = 400.0          ! clutter correlation length in time sampl
      bkgnd_mean   = 0.0            ! mean of clutter background
      bkgnd_rms    = 0.0            ! rms of clutter background
      gamma_rate   = 0.0            ! average events per sample
      gamma_height = 4.0            ! average height per gamma event
      photon_rms   = 1.0            ! rms of photon (white) gaussian noise
      readout_rms  = photon_rms * 0.0
      tgt_amp            = 4.0 * 2.0 ! target amplitude
      first_targ       = 40.0       ! position of first target
      targ_separation  = 40.0       ! separation (in samples) between targets
      dwell            = 4.0        ! samples per dwell
      sample_rate      = 4.0        ! samples per dwell
      tgt_width        = 2.0        ! width (in samples) of targets
      jitter_rms       = 0.0        ! RMS of jitter white noise
      velocity         = 0.0        ! target displacement between detectors
      bpgammas         = 0          ! bipolar gamma flag
                                    !     0 = only positive gammas
                                    !     1 = positive & negative gammas
      alpha = 50.0 * 64.0           ! time constant for SFP baseline tracking
      iseed = 2e6+13                ! random number generator seed
c
c  Generate loop for various input SNR's
c
      data tgt_amps /8.0, 40.0, 400.0, 4000.0/
      do 100 jtgt = 1, 4
         tgt_amp = tgt_amps(jtgt)
c
c  Create 64 per dwell sampled responses
c
```

```
            tgt_amp2  =  tgt_amp / 16.0           ! necessary conversions from
            tgt_width2 =  32.0                    ! 4/dwell to 100/dwell samples
            first_targ2 =  100.0 * 16.0
            targ_separation2 = 50.0 * 16.0
            photon_rms2 = photon_rms / 4.0
            gamma_rate2 = gamma_rate / 16.0
            n_inscan2 = n_inscan * 16
            n_int = 16 ! no. of samples to integrate to get 4 samples per dwell call generate_1d_data( sfp_a,
       1              n_tdi, n_inscan2, n_x_scan, n_colors,
       1              dc_bkgnd, corlen, bkgnd_mean, bkgnd_rms,
       1              tgt_amp2, tgt_width2, first_targ2, targ_separation2,
       1              jitter_rms, jitter_period, velocity,
       1              photon_rms2, readout_rms,
       1              gamma_rate2, gamma_height, bp_gammas, iseed)
c
c     Stochastic Focal Plane Sampling of High Amplitude Targets
c
            delta = photon_rms2
            xscale = 1.0/16.0
            do j=1, n_tdi
               temp = -delta/2.0              ! initial signal setting
               do i=1, n_inscan2
                  bit = sign(1.0, sfp_a(i,j) - temp)

temp2 = xscale*abs(temp)
                  if ( temp2 .gt. delta ) then
                     temp = temp + bit*temp2
                  else
                     temp = temp + bit*delta
                  endif sfp_b(i,j) = temp
               enddo
            enddo
c
c     Downsample to 4 per dwell by integrating every 16 samples
c
            do j=1, n_tdi
               temp = 0.0
               temp2 = 0.0
               k = 0
               k2 = 0
               do i=1, n_inscan2
                  temp = temp + sfp_a(i,j)
                  temp2 = temp2 + sfp_b(i,j)
                  k = k + 1
                  if( k .eq. n_int ) then
                     k2 = k2 + 1
                     tdi_x(k2,j) = temp
                     sfp_b2(k2,j) = temp2
                     temp = 0.0
                     temp2 = 0.0
                     k = 0
                  endif
               enddo
            enddo
c
c     Match filter
            call match_filter( sfp_b2, sfp_mf, n_inscan, n_tdi, tgt_width )
c
c     Move data samples for current SNR into master storage array
c
```

```
              do i=1, n_inscan
                 sfp_snr(i,jtgt) = sfp_mf(i,1)
              enddo 100       enddo ! next jtgt (SNR)
c
c     Write output listing - Consisting of simulation description plus sampled
c     data listed in five columns: sample index and samples from four input
c     SNR's (2, 10, 100, 1000).
c
          call date( today )
          open( unit=1, file='[michels.stochastic_focal_plane]sfp_big.dat',
     1          type='new', recl=130, carriagecontrol='list' )

write(1, '( //, '' IR Data Digital Signal Processing Simulation'',25x,
     1               a9 )')today
          write(1, '(
     1          '' Stochastic Focal Plane - High Amplitude Target Tracking'' )')
          write(1, '( i3, '' Detectors '' )' ) n_tdi
          write(1, '( '' Initial Settings  @ 4 samples per dwell '', / )' )
          write(1, '( '' Target Amplitude    = '', f9.1 )' ) tgt_amp
          write(1, '( '' Photon RMS          = '', f6.2 )' ) photon_rms
          if( bpgammas .eq. 1 ) then
              write(1, '( '' Bipolar Gammas '' )' )
          else
              write(1, '( '' Positive Amplitude Gammas '' )' )
          endif
          write(1, '( '' Mean Gamma Rate (per sample) = '', f6.2 )' ) gamma_rate
          write(1, '( '' Mean Gamma Height            = '', f6.2 )' ) gamma_height write(1, '( x,/, ''index    SNR=2     SNR=10     SNR=100    SNR=1000'' )' )
          do i=75, 174              ! 1, n_inscan
              write(1, '( x, i3, 4(3x, f8.2) )' ) i-75, (sfp_snr(i,j), j=1,4)
          enddo close(1)

END include '[michels.toolbox]data_sim_1d.sub'
          include '[michels.toolbox]match_filter.sub'
```

I claim:

1. An apparatus for detecting radiation comprising:
   a means responsive to infrared radiation for producing a first output signal comprising a gamma spike and having a magnitude related to intensity of the radiation and;
   a means for quantizing the gamma spike of the first output signal into a 1-bit signal related to the magnitude of the first output signal.

2. The apparatus of claim 1 comprising a means for producing samples of the first output signal, wherein the means for quantizing quantizes each sample into a 1-bit signal.

3. The apparatus of claim 2, the means for quantizing comprising a means for producing a reference voltage, the means for quantizing also producing the 1-bit signal based on a comparison of the first output signal with the reference voltage.

4. The apparatus of claim 3, the means responsive to radiation comprising at least one radiation detector, the means for quantizing comprising at least one 1-bit comparator which produces the 1-bit signal, the at least one 1-bit comparator having a first input connected to receive the first output signal from the at least one radiation detector and a second input connected to receive the reference voltage.

5. An apparatus for detecting radiation comprising:
   at least one radiation detector responsive to infrared radiation for producing a first output signal having a magnitude related to intensity of the radiation;
   a means for producing samples of the first output signal;
   a means comprising at least one 1-bit comparator having a first input connected to receive a sample of the first output signal and a second input connected to receive a reference voltage, for quantizing each sample of the first output signal into a 1-bit signal based on a comparison between the magnitude of the sample of the first output signal with the reference voltage; and
   a means for receiving the 1-bit signal from the 1-bit comparator and producing the reference voltage to the second input of the 1-bit comparator based on the 1-bit signal.

6. The apparatus of claim 5, the at least one radiation detector comprising an array of radiation detectors, the at least one 1-bit comparator comprising a plurality of 1-bit comparators connected at first inputs to receive first output signals from the array of radiation detectors, the apparatus comprising a means for multiplexing 1-bit signals from the plurality of 1-bit comparators and for generating a second output signal which indicates the detected radiation based on the 1-bit signals.

7. The apparatus of claim 6, comprising a differencing means for receiving third and fourth output signals from at least one pair of radiation detectors and producing a differencing signal to the first input of one of the plurality of 1-bit comparators based on a difference between the third and fourth output signals.

8. The apparatus of claim 7, the means for producing a reference voltage comprising a digital counter circuit that tabulates the 1-bit signals and produces a first reference 9. The apparatus of claim 8, the means for producing a reference voltage comprising an analog integrating means for receiving the first reference voltage and for producing a second reference voltage related to a responsivity of at least one radiation detector.

10. The apparatus of claim 9, the differencing means comprising a differential amplifier.

11. The apparatus of claim 5, comprising;
    a second 1-bit comparator;
    a means for storing a first value and producing a second reference voltage to the second 1-bit comparator based on the first value;
    a means for deriving a second value from the first value; and
    a means for receiving a 1-bit signals from the second 1-bit comparator as a sign signal, for summing the first value with the second value according to the 1-bit signals, and for producing a third value to the means for storing.

12. The apparatus of claim 11, comprising a means for receiving the second value and producing a signal having at least a minimum value to the means for receiving 1-bit signals.

13. The apparatus of claim 12, comprising a differencing means for producing a difference signal to the second 1-bit comparator based on the first output and the first reference voltage.

14. The apparatus of claim 13, the means for deriving comprising a shift register means for shifting the first value to derive the second value.

15. An apparatus for detecting radiation comprising:
    a means responsive to visible radiation for producing a first output signal comprising a gamma spike and having a magnitude related to intensity of the radiation and;
    a means for quantizing the gamma spike of the first output signal into a 1-bit signal related to the magnitude of the first output signal.

16. The apparatus of claim 15 comprising a means for producing samples of the first output signal, wherein the means for quantizing quantizes each sample into a 1-bit signal.

17. The apparatus of claim 16, the means for quantizing comprising a means for producing a reference voltage, the means for quantizing also producing the 1-bit signal based on a comparison of the first output signal with the reference voltage.

18. The apparatus of claim 17, the means responsive to radiation comprising at least one radiation detector, the means for quantizing comprising at least one 1-bit comparator which produces the 1-bit signal, the at least one 1-bit comparator having a first input connected to receive the first output signal from the at least one radiation detector and a second input connected to receive the reference voltage.

19. An apparatus for detecting radiation comprising:
    at least one radiation detector responsive to visible radiation for producing a first output signal having a magnitude related to intensity of the radiation;
    a means for producing samples of the first output signal;
    a means comprising at least one 1-bit comparator having a first input connected to receive a sample of the first output signal and a second input connected to receive a reference voltage, for quantizing each sample of the first output signal into a 1-bit signal based on a comparison between the magnitude of the sample of the first output signal with the reference voltage; and
    a means for receiving the 1-bit signal from the 1-bit comparator and producing the reference voltage to the second input of the 1-bit comparator based on the 1-bit signal.

20. The apparatus of claim 19, the at least one radiation detector comprising an array of radiation detectors, the at least one 1-bit comparator comprising a plurality of 1-bit comparators connected at first inputs to receive first output signals from the array of radiation detectors, the apparatus comprising a means for multiplexing 1-bit signals from the plurality of 1-bit comparators and for generating a second output signal which indicates the detected radiation based on the 1-bit signals.

21. The apparatus of claim 20, comprising a differencing means for receiving third and fourth output signals from at least one pair of radiation detectors and producing a differencing signal to the first input of one of the plurality of 1-bit comparators based on a difference between the third and fourth output signals.

22. The apparatus of claim 21, the means for producing a reference voltage comprising a digital counter circuit that tabulates the 1-bit signals and produces a first reference voltage.

23. The apparatus of claim 22, the means for producing a reference voltage comprising an analog integrating means for receiving the first reference voltage and for producing a second reference voltage related to a responsivity of at least one radiation detector.

24. The apparatus of claim 23, the differencing means comprising a differential amplifier.

25. The apparatus of claim 19, comprising;

a second 1-bit comparator;

a means for storing a first value and producing a second reference voltage to the second 1-bit comparator based on the first value;

a means for deriving a second value from the first value; and a means for receiving a 1-bit signal from the second 1-bit comparator as a sign signal, for summing the first value with the second value according to the 1-bit signals, and for producing a third value to the means for storing.

26. The apparatus of claim 25, comprising a means for receiving the second value and producing a signal having at least a minimum value to the means for receiving 1-bit signals.

27. The apparatus of claim 26, comprising a differencing means for producing a difference signal to the second 1-bit comparator based on the first output and the first reference voltage.

28. The apparatus of claim 27, the means for deriving comprising a shift register means for shifting the first value to derive the second value.

* * * * *